(12) United States Patent
Ishikawa et al.

(10) Patent No.: US 11,686,447 B2
(45) Date of Patent: Jun. 27, 2023

(54) CONTROL DEVICE FOR VEHICLE LAMP, VEHICLE LAMP SYSTEM, AND CONTROL METHOD FOR VEHICLE LAMP

(71) Applicant: KOITO MANUFACTURING CO., LTD., Tokyo (JP)

(72) Inventors: Masaaki Ishikawa, Shizuoka (JP); Kenta Ishigami, Shizuoka (JP); Atsushi Ogawa, Shizuoka (JP); Naoki Osada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/643,032

(22) Filed: Dec. 7, 2021

(65) Prior Publication Data

US 2022/0099267 A1 Mar. 31, 2022

Related U.S. Application Data

(63) Continuation of application No. PCT/JP2020/021832, filed on Jun. 2, 2020.

(30) Foreign Application Priority Data

Jun. 14, 2019 (JP) .............................. JP2019-111344
Jun. 14, 2019 (JP) .............................. JP2019-111346

(51) Int. Cl.
*F21S 41/657* (2018.01)
*F21S 41/675* (2018.01)
(Continued)

(52) U.S. Cl.
CPC ............ *F21S 41/657* (2018.01); *B60Q 1/115* (2013.01); *F21S 41/675* (2018.01); *F21S 45/43* (2018.01)

(58) Field of Classification Search
CPC ........ F21S 41/657; F21S 41/675; F21S 45/43; B60Q 1/115
See application file for complete search history.

(56) References Cited

U.S. PATENT DOCUMENTS

2012/0002430 A1  1/2012  Yamazaki et al.
2015/0142275 A1  5/2015  Yamazaki et al.
(Continued)

FOREIGN PATENT DOCUMENTS

EP    2402212 A2   1/2012
EP    2447127 A2   5/2012
(Continued)

OTHER PUBLICATIONS

International Search Report (PCT/ISA/210) and International Preliminary Examination Report on Patentability (PCT/IB/373) with Written Opinion (PCT/ISA/237), with English translations, dated Aug. 4, 2020, by the Japan Patent Office as the International Searching Authority for International Application No. PCT/JP2020/021832.

(Continued)

*Primary Examiner* — Thomas M Sember
(74) *Attorney, Agent, or Firm* — Buchanan Ingersoll & Rooney PC

(57) ABSTRACT

A control device for a vehicle lamp controls an adjustment of an optical axis angle of a vehicle lamp provided with a vibration generating source that vibrates at a first frequency, and the control device includes an acceleration sensor provided in the vehicle lamp and configured to sample an acceleration at a second frequency that is a non-integral multiple of the first frequency, a receiving unit that receives a signal indicating an output value from the acceleration sensor, and a controlling unit that executes control of adjust- (Continued)

ing the optical axis angle of the vehicle lamp on the basis of the output value from the acceleration sensor.

8 Claims, 12 Drawing Sheets

(51) Int. Cl.
  *F21S 45/43* (2018.01)
  *B60Q 1/115* (2006.01)

(56) References Cited

U.S. PATENT DOCUMENTS

| 2017/0297477 A1 | 10/2017 | Kasaba et al. |
| 2018/0334083 A1 | 11/2018 | Nakamura et al. |

FOREIGN PATENT DOCUMENTS

| EP | 2514636 A2 | 10/2012 |
| EP | 2559935 A1 | 2/2013 |
| JP | 2011129447 A | 6/2011 |
| JP | 2012030782 A | 2/2012 |
| JP | 2012101624 A | 5/2012 |
| JP | 2012101625 A | 5/2012 |
| JP | 2013086663 A | 5/2013 |
| JP | 2014104787 A | 6/2014 |
| JP | 2017001613 A | 1/2017 |
| WO | 2017104167 A1 | 6/2017 |
| WO | 2018134876 A1 | 7/2018 |

OTHER PUBLICATIONS

Office Action (Communication pursuant to Rule 164(1) EPC/The partial supplementary European search report) dated May 10, 2022, issued in corresponding European Patent Application No. 20823300.7. (15 pages).

Office Action (The extended European search report) dated May 3, 2023, issued for corresponding European Patent Application No. 23154529.4 (8 pages).

CONTROL DEVICE FOR VEHICLE LAMP, VEHICLE LAMP SYSTEM, AND CONTROL METHOD FOR VEHICLE LAMP

CROSS-REFERENCE TO RELATED APPLICATIONS

This application is based upon and claims the benefit of priority from the prior Japanese Patent Application No. 2019-111344, filed on Jun. 14, 2019, the prior Japanese Patent Application No. 2019-111346, filed on Jun. 14, 2019, and International Patent Application No. PCT/JP2020/021832, filed on Jun. 2, 2020, the entire content of each of which is incorporated herein by reference.

BACKGROUND

Field of the Invention

The present invention relates to control devices for vehicle lamps, vehicle lamp systems, and control methods for vehicle lamps. In particular, the present invention relates to a control device for a vehicle lamp used in an automobile or the like, a vehicle lamp system, and a control method for the vehicle lamp.

Description of the Related Art

Conventionally, self-leveling control is known in which the position of an optical axis of a vehicle headlamp is adjusted automatically in accordance with an angle of inclination of the vehicle and the direction in which the headlamps shine is thus changed. In the self-leveling control, generally, the position of the optical axis of the headlamp is adjusted on the basis of the pitch angle of the vehicle derived from an output value from a vehicle height sensor. In contrast, patent document 1 discloses a control device for a vehicle lamp that carries out the self-leveling control with the use of an acceleration sensor.
Patent document 1: JP2012-030782

A less expensive and more lightweight self-leveling system can be achieved when an acceleration sensor is used than when a vehicle height sensor is used. This can serve to reduce the cost and lighten the weight of a vehicle as a result. Meanwhile, there is a persistent demand for a higher accuracy of self-leveling control even when an acceleration sensor is used.

SUMMARY OF THE INVENTION

One single objective of the present invention, brought about in view of such circumstances, is to make available technology for increasing the accuracy of self-leveling control of vehicle lamps.

In addressing the above, one aspect of the present invention provides a control device for a vehicle lamp, and the control device controls an adjustment of an optical axis angle of a vehicle lamp provided with a vibration generating source that vibrates at a first frequency. This control device includes an acceleration sensor, a receiving unit, and a controlling unit. The acceleration sensor is provided in the vehicle lamp and configured to sample an acceleration at a second frequency that is a non-integral multiple of the first frequency. The receiving unit receives a signal indicating an output value from the acceleration sensor. The controlling unit executes control of adjusting the optical axis angle of the vehicle lamp on the basis of the output value from the acceleration sensor.

Another aspect of the present invention provides a vehicle lamp system. This vehicle lamp system includes a vehicle lamp with an adjustable optical axis and the control device for a vehicle lamp according to any of the aspects above.

Another aspect of the present invention provides a control method for a vehicle lamp. The control method controls an adjustment of an optical axis angle of a vehicle lamp provided with a vibration generating source that vibrates at a first frequency. This control method includes sampling, with an acceleration sensor provided in the vehicle lamp, an acceleration at a second frequency that is a non-integral multiple of the first frequency, and adjusting the optical axis angle of the vehicle lamp on the basis of the sampled acceleration.

Another aspect of the present invention provides a control device for a vehicle lamp. This control device includes a receiving unit, a controlling unit, and a movement determining unit. The receiving unit receives a signal indicating an output value from a tilt sensor enabled for deriving an angle of inclination of a vehicle relative to a horizontal plane. The controlling unit outputs an adjustment signal instructing that an optical axis angle of the vehicle lamp be adjusted with respect to a change in the angle of inclination observed while the vehicle is at rest and either refrains from generating or outputting the adjustment signal or outputs a maintaining signal instructing that the optical axis angle be maintained with respect to a change in the angle of inclination observed while the vehicle is traveling. The movement determining unit determines whether the vehicle has moved while an ignition switch is in an off state. The controlling unit outputs the adjustment signal with respect to a change in the angle of inclination observed while the ignition switch is in an off state if the movement determining unit has determined that the vehicle has not moved and either refrains from generating or outputting the adjustment signal or outputs the maintaining signal with respect to a change in the angle of inclination observed while the ignition switch is in an off state if the movement determining unit has determined that the vehicle has moved.

Another aspect of the present invention provides a vehicle lamp system. This vehicle lamp system includes a vehicle lamp with an adjustable optical axis, a tilt sensor enabled for deriving an angle of inclination of a vehicle relative to a horizontal plane, and the control device for a vehicle lamp according to any of the above aspects.

Any desired combination of the above constituent elements or an embodiment obtained by converting what is expressed by the present invention among a method, an apparatus, a system, and so on is also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are re numbered alike in several Figures, in which.

DETAILED DESCRIPTION OF THE INVENTION

Figure 1:
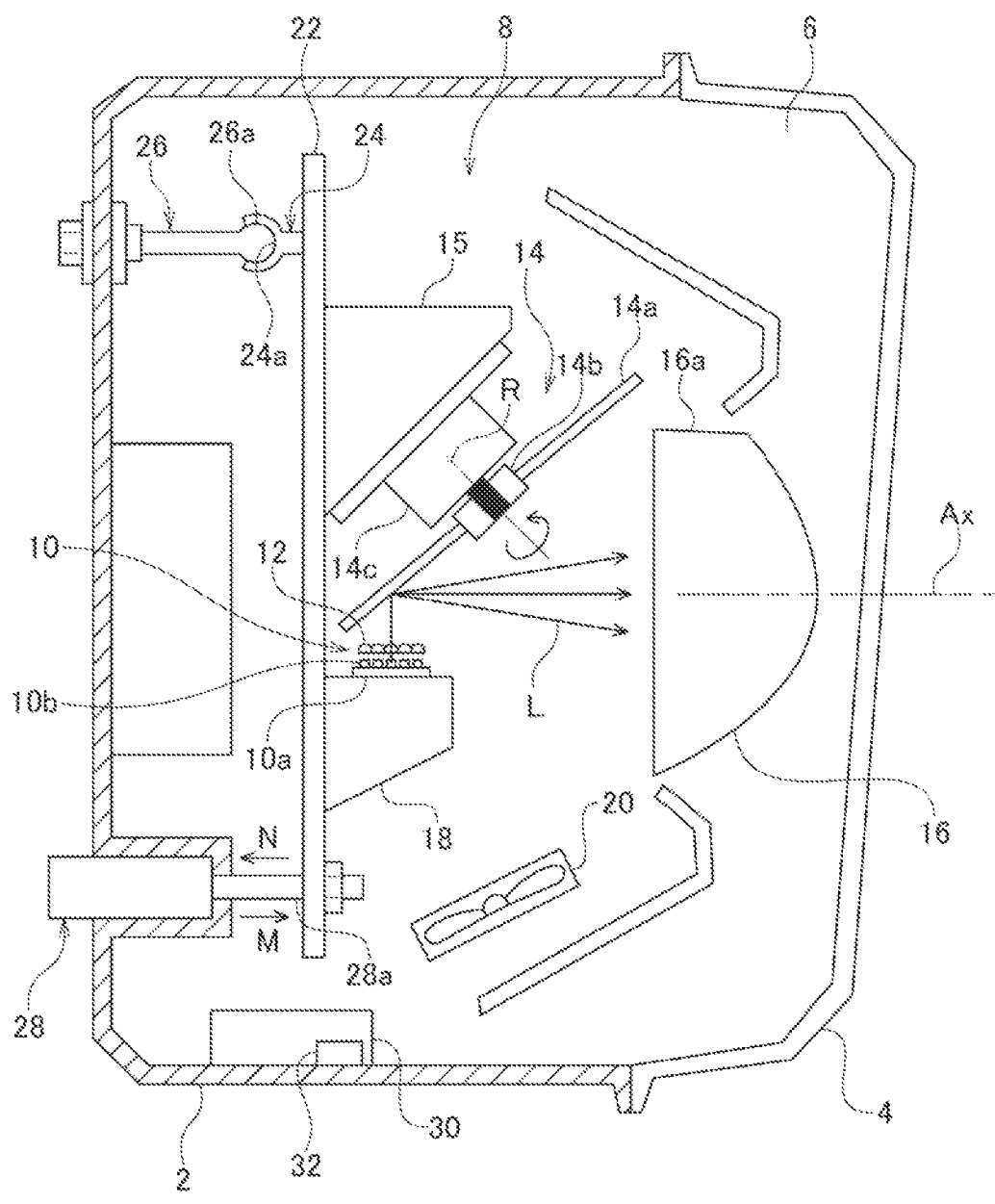
FIG. 1 is a vertical sectional view of a vehicle lamp according to Embodiment 1.

One aspect of the present invention provides a control device for a vehicle lamp, and the control device controls an adjustment of an optical axis angle of a vehicle lamp provided with a vibration generating source that vibrates at a first frequency. This control device includes an acceleration sensor, a receiving unit, and a controlling unit. The acceleration sensor is provided in the vehicle lamp and configured to sample an acceleration at a second frequency that is a non-integral multiple of the first frequency. The receiving unit receives a signal indicating an output value from the acceleration sensor. The controlling unit executes control of adjusting the optical axis angle of the vehicle lamp on the basis of the output value from the acceleration sensor.

In the above aspect, the vibration generating source may be a fan for cooling a heat generating member provided in the vehicle lamp. In any of the above aspects, the vibration generating source may be a rotary reflector that rotates about an axis of rotation while reflecting light emitted from a light source. In any of the above aspects, a total angle including a road surface angle and a vehicle attitude angle may be derivable from the output value from the acceleration sensor, the total angle may be an angle of inclination of a vehicle relative to a horizontal plane, the road surface angle may be an angle of inclination of a road surface relative to the horizontal plane, and the vehicle attitude angle may be an angle of inclination of the vehicle relative to the road surface. The controlling unit may hold a reference value of the road surface angle and a reference value of the vehicle attitude angle. With respect to a change in the total angle observed while the vehicle is at rest, the controlling unit may output an adjustment signal instructing that the optical axis angle be adjusted and hold, as a new reference value of the vehicle attitude angle, a vehicle attitude angle that is equal to a total of an amount of change in the total angle observed while the vehicle is at rest and the reference value of the vehicle attitude angle. With respect to a change in the total angle observed while the vehicle is traveling, the controlling unit may either refrain from generating or outputting the adjustment signal or output a maintaining signal instructing that the optical axis angle be maintained and execute control of holding, as a new reference value of the road surface angle, a road surface angle that is equal to a total of an amount of change in the total angle observed while the vehicle is traveling and the reference value of the road surface angle.

Another aspect of the present invention provides a vehicle lamp system. This vehicle lamp system includes a vehicle lamp with an adjustable optical axis and the control device for a vehicle lamp according to any of the aspects above.

Another aspect of the present invention provides a control method for a vehicle lamp. The control method controls an adjustment of an optical axis angle of a vehicle lamp provided with a vibration generating source that vibrates at a first frequency. This control method includes sampling, with an acceleration sensor provided in the vehicle lamp, an acceleration at a second frequency that is a non-integral multiple of the first frequency, and adjusting the optical axis angle of the vehicle lamp on the basis of the sampled acceleration.

Another aspect of the present invention provides a control device for a vehicle lamp. This control device includes a receiving unit, a controlling unit, and a movement determining unit. The receiving unit receives a signal indicating an output value from a tilt sensor enabled for deriving an angle of inclination of a vehicle relative to a horizontal plane. The controlling unit outputs an adjustment signal instructing that an optical axis angle of the vehicle lamp be adjusted with respect to a change in the angle of inclination observed while the vehicle is at rest and either refrains from generating or outputting the adjustment signal or outputs a maintaining signal instructing that the optical axis angle be maintained with respect to a change in the angle of inclination observed while the vehicle is traveling. The movement determining unit determines whether the vehicle has moved while an ignition switch is in an off state. The controlling unit outputs the adjustment signal with respect to a change in the angle of inclination observed while the ignition switch is in an off state if the movement determining unit has determined that the vehicle has not moved and either refrains from generating or outputting the adjustment signal or outputs the maintaining signal with respect to a change in the angle of inclination observed while the ignition switch is in an off state if the movement determining unit has determined that the vehicle has moved.

In the above aspect, when the angle of inclination of the vehicle relative to the horizontal plane is referred to as a total angle, the total angle may include a road surface angle and a vehicle attitude angle, the road surface angle may be an angle of inclination of a road surface relative to the horizontal plane, and the vehicle attitude angle may be an angle of inclination of the vehicle relative to the road surface. The controlling unit may hold, in a volatile state, a reference value of the road surface angle and a reference value of the vehicle attitude angle. With respect to a change in the total angle observed while the vehicle is at rest, the controlling unit may hold, as a new reference value of the vehicle attitude angle, a vehicle attitude angle that is equal to a total of an amount of change in the total angle observed while the vehicle is at rest and the reference value of the vehicle attitude angle. With respect to a change in the total angle observed while the vehicle is traveling, the controlling unit may hold, as a new reference value of the road surface angle, a road surface angle that is equal to a total of an amount of change in the total angle observed while the vehicle is traveling and the reference value of the road surface angle.

In the above aspect, the control device for a vehicle lamp may further include a storage for storing, in a non-volatile state, the reference value of the road surface angle and the reference value of the vehicle attitude angle that the controlling unit holds when the ignition switch shifts to an off state. In response to the ignition switch shifting to an on state, the controlling unit may hold, as a new reference value of the road surface angle, a road surface angle obtained from the current total angle and the reference value of the vehicle attitude angle read out from the storage if the movement determining unit has determined that the vehicle has moved, and hold, as a new reference value of the vehicle attitude angle, a vehicle attitude angle obtained from the current total angle and the reference value of the road surface angle read out from the storage if the movement determining unit has determined that the vehicle has not moved.

In the above aspects, the control device for a vehicle lamp may further include a storage for storing, in a non-volatile state, the reference value of the vehicle attitude angle that the controlling unit holds when the ignition switch shifts to an off state and the total angle held when the ignition switch shifts to an off state. In response to the ignition switch shifting to an on state, the controlling unit may hold, as a new reference value of the road surface angle, a road surface angle obtained from the current total angle and the reference value of the vehicle attitude angle read out from the storage if the movement determining unit has determined that the vehicle has moved, and hold, as a new reference value of the vehicle attitude angle, a vehicle attitude angle obtained from the reference value of the vehicle attitude angle read out from the storage and a difference between the current total angle and the total angle read out from the storage and hold, as a new reference value of the road surface angle, a road surface angle obtained from the current total angle and the calculated vehicle attitude angle if the movement determining unit has determined that the vehicle has not moved.

In the above aspects, the control device for a vehicle lamp may further include a storage for storing, in a non-volatile state, the reference value of the road surface angle that the controlling unit holds when the ignition switch shifts to an off state and the total angle held when the ignition switch shifts to an off state. In response to the ignition switch shifting to an on state, the controlling unit may hold, as a new reference value of the road surface angle, a road surface angle obtained from the reference value of the road surface angle read out from the storage and a difference between the current total angle and the total angle read out from the storage and hold, as a new reference value of the vehicle attitude angle, a vehicle attitude angle obtained from the current total angle and the calculated road surface angle if the movement determining unit has determined that the vehicle has moved, and hold, as a new reference value of the vehicle attitude angle, a vehicle attitude angle obtained from the current total angle and the reference value of the road surface angle read out from the storage if the movement determining unit has determined that the vehicle has not moved.

In the above aspects, the control device for a vehicle lamp may further include a storage for storing, in a non-volatile state, the reference value of the vehicle attitude angle that the controlling unit holds when the ignition switch shifts to an off state, the reference value of the vehicle attitude angle that the controlling unit holds when the ignition switch shifts to an off state, and the total angle held when the ignition switch shifts to an off state. In response to the ignition switch shifting to an on state, the controlling unit may hold, as a new reference value of the road surface angle, a road surface angle obtained from the reference value of the road surface angle read out from the storage and a difference between the current total angle and the total angle read out from the storage if the movement determining unit has determined that the vehicle has moved, and hold, as a new reference value of the vehicle attitude angle, a vehicle attitude angle obtained from the reference value of the vehicle attitude angle read out from the storage and a difference between the current total angle and the total angle read out from the storage if the movement determining unit has determined that the vehicle has not moved.

In any of the above aspects, the movement determining unit may determine whether the vehicle has moved while the ignition switch is in an off state on the basis of any one or more of position information of the vehicle, a signal identifying whether the vehicle is on a market or at a plant, and information regarding an object in surroundings of the vehicle.

Another aspect of the present invention provides a vehicle lamp system. This vehicle lamp system includes a vehicle lamp with an adjustable optical axis, a tilt sensor enabled for deriving an angle of inclination of a vehicle relative to a horizontal plane, and the control device for a vehicle lamp according to any of the above aspects.

Hereinafter, the present invention will be described on the basis of some exemplary embodiments with reference to the drawings. The embodiments are illustrative in nature and are not intended to limit the invention. Not all the features and combinations thereof described according to the embodiments are necessarily essential to the invention. Identical or equivalent constituent elements, members, and processes illustrated in the drawings are given identical reference characters, and duplicate descriptions thereof will be omitted as appropriate.

The scales and the shapes of the components illustrated in the drawings are set merely for convenience in order to facilitate an understanding of the description and are not to be interpreted as limiting the invention, unless specifically indicated otherwise. When terms such as "first" and "second" are used in the present specification and in the claims, these terms do not indicate the order or the levels of importance in any way and are merely used to distinguish between a given configuration and another configuration, unless specifically indicated otherwise. Any member or members that are not important in describing the embodiments are omitted from the drawings.

Embodiment 1

In the present specification, the expression "while a vehicle is traveling" refers, for example, to a period from when the output value from a vehicle speed sensor 308, which will be described later, has exceeded 0 to when the output value from the vehicle speed sensor 308 has returned to 0. The expression "when a vehicle is stopping" refers, for example, to a point when the output value from an acceleration sensor 32, which will be described later, has stabilized after the output value from the vehicle speed sensor has become 0. The expression "while a vehicle is at rest" refers, for example, to a period from when the output value from the acceleration sensor 32 has stabilized to when the output value from the vehicle speed sensor 308 has exceeded 0. The expression "when the output value has stabilized" may mean the time when an amount of change per unit time in the output value from the acceleration sensor 32 has become no greater than a predetermined amount or may mean a point when a predetermined period has passed (for example, 1 to 2 seconds later) after the output value from the vehicle speed sensor 308 has become 0. The expression "a vehicle 300 is being parked" means that the vehicle 300 is in the state of either "when a vehicle is stopping" or "while a vehicle is at rest." The expression "immediately after a vehicle has started traveling" covers, for example, a predetermined period following when the output value from the vehicle speed sensor 308 has exceeded 0. The expression "immediately before a vehicle starts traveling" covers, for example, a time preceding, by a predetermined period, a point when the output value from the vehicle speed sensor 308 has exceeded 0. The expressions "while a vehicle is traveling," "when a vehicle is stopping," "while a vehicle is at rest," "when the output value has stabilized," "immediately after a vehicle has started traveling," "immediately before a vehicle starts traveling," "a predetermined amount," and "a predetermined period" described above can be set as appropriate on the basis of an experiment or a simulation conducted by a designer.

FIG. 1 is a vertical sectional view of a vehicle lamp according to Embodiment 1. A vehicle lamp 1 according to the present embodiment is a vehicle headlamp that includes a pair of headlamp units formed symmetrically along the right-and-left direction. These two headlamp units are disposed at right and left ends of a vehicle in its widthwise direction. The right-side headlamp unit and the left-side headlamp unit have substantially identical configurations. Therefore, only the structure of one of the headlamp units will be described below as a structure of the vehicle lamp 1, and the description of the structure of the other headlamp unit will be omitted.

The vehicle lamp 1 includes a lamp body 2 and a light-transmissive cover 4. The lamp body 2 has a recess portion that opens in the front direction of the vehicle. The light-transmissive cover 4 covers the opening of the lamp body 2. The lamp body 2 and the light-transmissive cover 4 form a lamp room 6. The lamp room 6 houses an optical unit 8.

The optical unit 8 includes a light source 10, a condenser lens 12, a rotary reflector 14, a projection lens 16, and a heat sink 18. The light source 10 has a structure in which a plurality of light emitting elements 10b are arranged in an array on a circuit board 10a. Each light emitting element 10b is configured to be capable of being turned on or off independently. A semiconductor light emitting element, such as an LED, an EL, or an LD, can be used as each light emitting element 10b. Alternatively, the light source 10 may be implemented by, for example but not limited to, an incandescent lamp, a halogen lamp, or a discharge lamp.

The condenser lens 12 is an optical member that directs light L emitted from the light source 10 toward a blade 14a of the rotary reflector 14 by changing the optical path of the light L. The rotary reflector 14 is an optical member that rotates about an axis of rotation R while reflecting the light L emitted from the light source 10. The rotary reflector 14 includes a plurality of blades 14a, a rotary cylinder 14b, and a motor 14c that serves as a driving source. The plurality of blades 14a function as a surface for reflecting the light L and are fixed to a peripheral surface of the rotary cylinder 14b. The attitude of the rotary cylinder 14b is set such that a center axis of the cylinder coincides with an output shaft of the motor 14c, and the rotary cylinder 14b is fixed to the output shaft of the motor 14c. The output shaft of the motor 14c and the center axis of the rotary cylinder 14b coincide with the axis of rotation R of the rotary reflector 14.

Upon the motor 14c being driven, the blades 14a turn in one direction about the axis of rotation R. The blades 14a reflect the light L while turning and thus scan the light L toward the space in front of the lamp. With this configuration, a desired light-distribution pattern can be formed in the space in front of the lamp. For example, through a combination of the on/off of the light source 10 and the rotation of the rotary reflector 14, the optical unit 8 can form a high-beam light-distribution pattern having a shaded portion that lies in a region where an oncoming vehicle in front of the host vehicle is present.

The projection lens 16 is an optical member that projects the light L reflected by the rotary reflector 14 toward the space in front of the lamp. The projection lens 16 is constituted, for example, by a plano-convex aspherical lens. The shape of the projection lens 16 can be selected, as appropriate, in accordance with a required light-distribution pattern or light-distribution characteristics such as the luminous intensity distribution. The projection lens 16 according to the present embodiment includes a cut-out portion 16a at a portion of its outer periphery. The presence of the cut-out portion 16a can help reduce the likelihood that the blades 14a of the rotary reflector 14 interfere with the projection lens 16 and allows the projection lens 16 and the rotary reflector 14 to be disposed closer to each other.

The heat sink 18 is a member for cooling the light source 10. The heat sink 18 is disposed opposite the rotary reflector 14 across the light source 10. The light source 10 is fixed to the heat sink 18 on its surface that faces the rotary reflector 14. The light source 10 is cooled as the heat from the light source 10 is conducted to the heat sink 18. The lamp room 6 further houses a fan 20. The fan 20 is fixed to the lamp body 2 via a support mechanism (not illustrated) and blows an air toward the heat sink 18. This can accelerate the heat dissipation from the heat sink 18 and help further cool the light source 10.

The optical unit 8 is supported by the lamp body 2 via a lamp bracket 22. The lamp bracket 22 is, for example, a plate-like member having principal surfaces and is disposed with the principal surfaces facing the front-and-back direction of the lamp. The optical unit 8 is fixed to the one of the principal surfaces that faces the front direction of the lamp. The light source 10 is fixed to the lamp bracket 22 via the heat sink 18. The rotary reflector 14 is fixed to the lamp bracket 22 via a pedestal 15. The projection lens 16 is fixed to the lamp bracket 22 via a lens holder (not illustrated).

The lamp bracket 22 includes a joint receiver 24 provided at an upper end portion of the principal surface that faces the back direction of the lamp. The joint receiver 24 projects in the back direction of the lamp. A shaft 26 is coupled to the joint receiver 24, and the shaft 26 penetrates through a wall of the lamp body 2 and extends in the front direction of the lamp. A ball portion 26a for a ball joint is provided at a leading end of the shaft 26. A ball-shaped space 24a that follows the shape of the ball portion 26a for a ball joint is provided in the joint receiver 24. The joint receiver 24 and the shaft 26 become coupled to each other as the ball portion 26a for a ball joint is fitted into the ball-shaped space 24a.

A leveling actuator 28 is coupled to the lamp bracket 22 at a lower end portion of the principal surface that faces the back direction of the lamp. The leveling actuator 28 is constituted, for example, by a motor that causes a rod 28a to extend or contract in the direction indicated by arrows M and N. A leading end of the rod 28a is fixed to the lamp bracket 22. When the rod 28a is extended in the direction of the arrow M, the optical unit 8 becomes displaced about the fulcrum served by an engagement portion where the joint receiver 24 and the shaft 26 engage with each other, and assumes a backward tilted attitude. Meanwhile, when the rod 28a is contracted in the direction of the arrow N, the optical unit 8 becomes displaced about the fulcrum served by the stated engagement portion and assumes a forward tilted attitude. Accordingly, driving the leveling actuator 28 enables the leveling adjustment with which the pitch angle of an optical axis Ax of the vehicle lamp 1 is directed upward or downward. It is to be noted that the structure of the optical unit 8 itself, the support structure of the optical unit 8, and so on are not limited to those described above.

The lamp room 6 further houses a leveling ECU 30 and the acceleration sensor 32 that function as a control device for a vehicle lamp according to the present embodiment. Now, the leveling ECU 30 and the acceleration sensor 32 will be described in detail.

Figure 2:
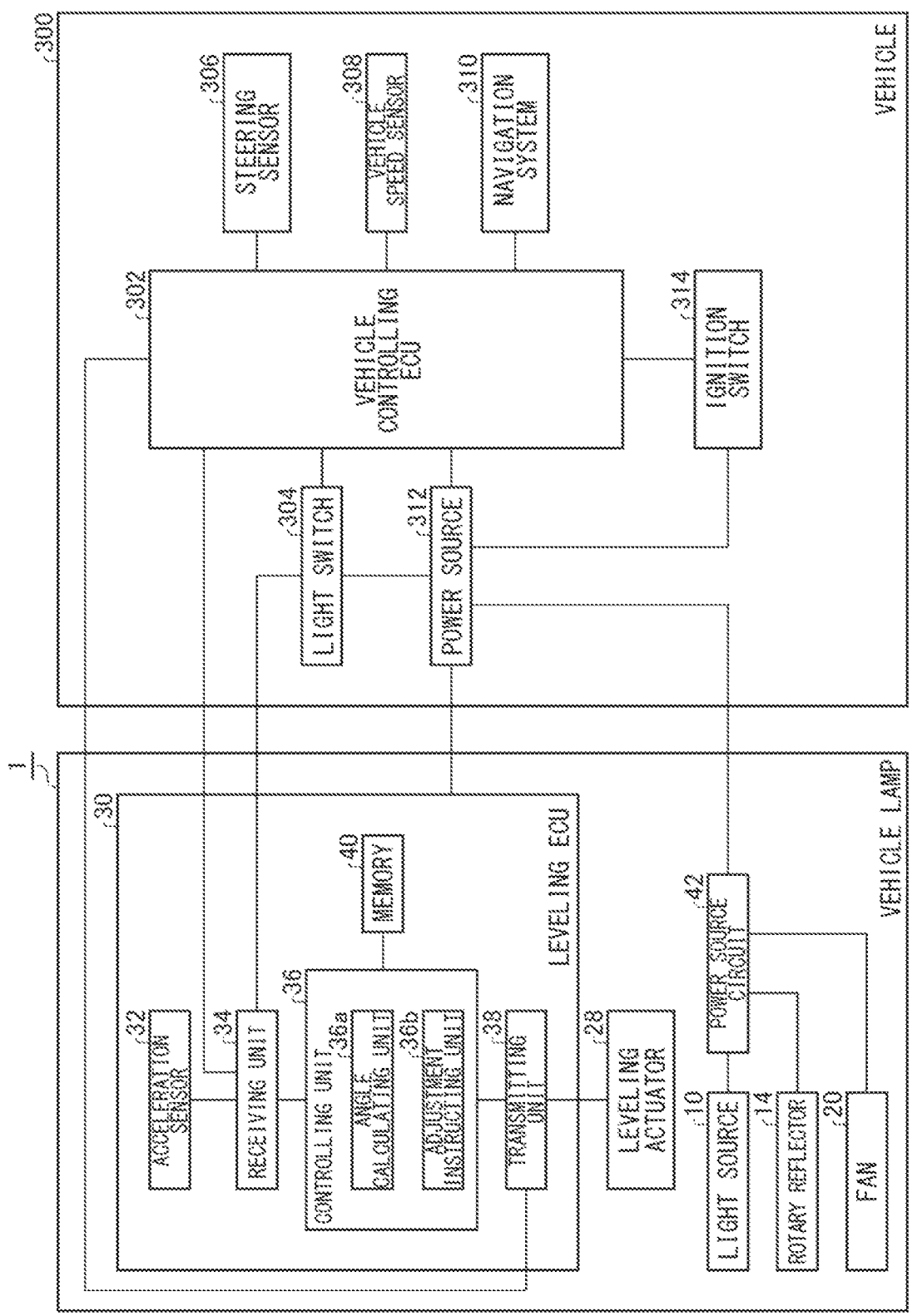
FIG. 2 is a functional block diagram illustrating cooperation of a vehicle lamp, a leveling ECU, and a vehicle controlling ECU.

FIG. 2 is a functional block diagram illustrating cooperation of a vehicle lamp, a leveling ECU, and a vehicle controlling ECU. The leveling ECU 30 and a vehicle controlling ECU 302 are implemented, in terms of their hardware configuration, by elements such as a CPU and a memory of a computer or circuits and implemented, in terms of their software configuration, by a computer program or the like. The leveling ECU 30 and the vehicle controlling ECU 302 are depicted in FIG. 2 as functional blocks implemented through cooperation of the above. It is to be appreciated by a person skilled in the art that these functional blocks can be implemented in a variety of forms through combinations of hardware and software.

The leveling ECU 30 includes the acceleration sensor 32, a receiving unit 34, a controlling unit 36, a transmitting unit 38, and a memory 40. The acceleration sensor 32 according to the present embodiment is provided in the vehicle lamp 1 with the acceleration sensor 32 mounted on a circuit board of the leveling ECU 30. However, there is no particular limitation to this configuration, and the acceleration sensor 32 may be mounted on another circuit board separate from the leveling ECU 30. In this case, the leveling ECU 30 may be disposed inside the vehicle 300, for example, in the vicinity of the dashboard or the like. The vehicle controlling ECU 302 and a light switch 304, which are provided in the vehicle 300, are connected to the leveling ECU 30. A signal output from the vehicle controlling ECU 302 or the light switch 304 is received by the receiving unit 34. The receiving unit 34 also receives a signal indicating an output value from the acceleration sensor 32.

A steering sensor 306, a vehicle speed sensor 308, a navigation system 310, and so on, which are provided in the vehicle 300, are connected to the vehicle controlling ECU 302. Signals output from these elements are received by the receiving unit 34 via the vehicle controlling ECU 302, as necessary. The light switch 304 transmits, to the vehicle controlling ECU 302 or the leveling ECU 30, a signal for controlling the on/off state of the vehicle lamp 1, a signal for instructing execution of self-leveling control, and so on in accordance with the content of an operation performed by the driver. Moreover, the light switch 304 transmits a signal to a power source 312 provided in the vehicle 300.

A signal that the receiving unit 34 has received is transmitted to the controlling unit 36. The controlling unit 36 calculates the pitch angle of the optical axis Ax of the vehicle lamp 1 suitable for the attitude of the vehicle 300 on the basis of the output value from the acceleration sensor 32 (this angle is referred to below as an optical axis angle θo, as appropriate). In other words, the controlling unit 36 calculates the optical axis angle θo that the vehicle lamp 1 should hold. Then, the controlling unit 36 controls the current optical axis angle θo so that the optical axis angle θo approaches the calculated optical axis angle θo. The term "approach" encompasses a case where the current optical axis angle θo of the vehicle lamp 1 coincides with the calculated optical axis angle θo. The controlling unit 36 can operate as the integrated circuit constituting the controlling unit 36 executes a program stored in a RAM or the memory 40.

The controlling unit 36 includes an angle calculating unit 36a and an adjustment instructing unit 36b. The angle calculating unit 36a generates pitch angle information of the vehicle 300 with the use of the output value from the acceleration sensor 32 and, as necessary, information held in the RAM (not illustrated) or the memory 40 included in the leveling ECU 30. For example, the angle calculating unit 36a holds, in the RAM, the output value from the acceleration sensor 32 transmitted from the receiving unit 34. In response to the number of the acquired output values reaching a predetermined number, the angle calculating unit 36a performs an averaging process on the acquired plurality of output values and derives the pitch angle of the vehicle 300 on the basis of the output value obtained through the averaging process.

The adjustment instructing unit 36b determines the optical axis angle θo that the vehicle lamp 1 should hold on the basis of the pitch angle information generated by the angle calculating unit 36a. Then, the adjustment instructing unit 36b generates an adjustment signal instructing that the optical axis angle θo be adjusted. The adjustment instructing unit 36b outputs the generated adjustment signal to the leveling actuator 28 via the transmitting unit 38. The leveling actuator 28 is driven on the basis of the received adjustment signal, and thus the optical axis Ax of the vehicle lamp 1 is adjusted with respect to the pitch angle direction. An operation of each unit included in the controlling unit 36 will be described later in detail.

The vehicle 300 is provided with the power source 312 that supplies power to the leveling ECU 30, the vehicle controlling ECU 302, and a power source circuit 42 of the vehicle lamp 1. Upon the light switch 304 being operated to instruct that the vehicle lamp 1 be turned on, power is supplied from the power source 312 to the light source 10 via the power source circuit 42. The power source circuit 42 further supplies power to the rotary reflector 14 and the fan 20, as necessary. The power is supplied from the power source 312 to the leveling ECU 30 when an ignition switch 314 is on and is shut off when the ignition switch 314 is off.

(Self-Leveling Control)

Figure 3:
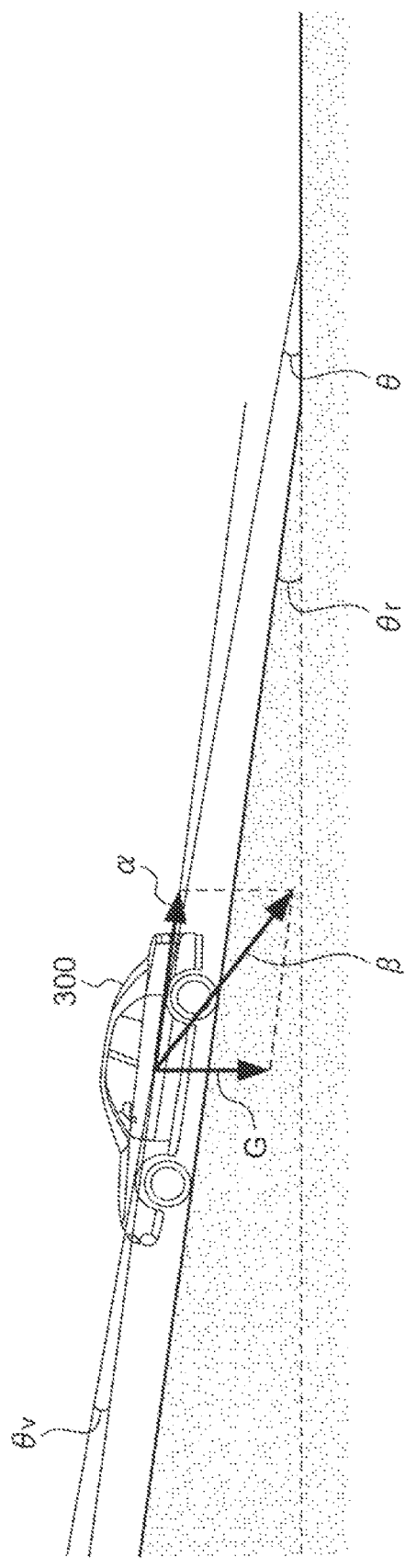
FIG. 3 is a schematic diagram for describing an acceleration vector produced in a vehicle and an angle of inclination of the vehicle that can be detected by an acceleration sensor.

Next, self-leveling control executed by the leveling ECU 30 configured as described above will be described in detail. FIG. 3 is a schematic diagram for describing an acceleration vector produced in the vehicle and an angle of inclination of the vehicle that can be detected by an acceleration sensor.

For example, when luggage is in the trunk in the back side of the vehicle or when a passenger is in the backseat, the vehicle has a backward tilted attitude. Meanwhile, when luggage is removed from the trunk or when a passenger in the backseat gets out of the vehicle, the vehicle enters a more forward tilted state than that of the backward tilted attitude. When the vehicle 300 has a backward tilted attitude or a forward tilted attitude, the direction in which the vehicle lamp 1 shines varies in the top-and-bottom direction accordingly, and the forward range increases or decreases. Thus, the leveling ECU 30 derives either the angle of inclination of the vehicle 300 in the pitch direction or an amount of change in the angle of inclination from the output value from the acceleration sensor 32 and brings the optical axis angle θo to the angle corresponding to the attitude of the vehicle. Carrying out the self-leveling control of adjusting the leveling of the vehicle lamp 1 in real time on the basis of the attitude of the vehicle makes it possible to adjust the range of the forward irradiation light to an optimum even when the attitude of the vehicle changes.

According to the present embodiment, the acceleration sensor 32 is, for example, a triaxial acceleration sensor having an X-axis, a Y-axis, and a Z-axis that are orthogonal to one another. The acceleration sensor 32 is attached to the vehicle 300 in a desired posture and detects the acceleration vector produced in the vehicle 300. The gravitational acceleration and the motion acceleration produced through the movement of the vehicle 300 are produced in the traveling vehicle 300. Therefore, as illustrated in FIG. 3, the acceleration sensor 32 can detect a composite acceleration vector β in which the gravitational acceleration vector G and the motion acceleration vector α are combined. In addition, while the vehicle 300 is at rest, the acceleration sensor 32 can detect the gravitational acceleration vector G. The acceleration sensor 32 outputs the numerical value of each of the axial components of the detected acceleration vector.

Since the acceleration sensor 32 is attached to the vehicle lamp 1 at a desired posture, the X-axis, the Y-axis, and the Z-axis of the acceleration sensor 32 (the axes of the sensor) held in the state in which the acceleration sensor 32 is mounted in the vehicle lamp 1 do not necessarily coincide with the front-and-back axis, the right-and-left axis, and the top-and-bottom axis of the vehicle 300 (the axes of the vehicle) that determine the attitude of the vehicle 300. Therefore, the controlling unit 36 needs to convert the components on the three axes output from the acceleration sensor 32, or in other words, the components on the sensor coordinate system into the components on the three axes of the vehicle 300, or in other words, into the components on the vehicle coordinate system.

The leveling ECU 30 holds in advance reference axis information indicating a positional relationship among the axes of the acceleration sensor 32 held in a state in which the acceleration sensor 32 is attached to the vehicle lamp 1, the axes of the vehicle 300, and the road surface angle. For example, as the reference axis information, the leveling ECU 30 holds, in the memory 40, a conversion table that maps the numerical value of each axial component in the output value from the acceleration sensor 32 to the numerical value of each axial component of the vehicle 300. The memory 40 according to the present embodiment is a non-volatile memory. The angle calculating unit 36a acquires a plurality of numerical values of each of the X-axis component, the Y-axis component, and the Z-axis component output from the acceleration sensor 32. Then, the angle calculating unit 36a performs an averaging process on each component and then converts the result of the averaging process into a front-and-back axis component, a right-and-left axis component, and a top-and-bottom axis component of the vehicle 300 with the use of the reference axis information. Thus, the acceleration in the front-and-back direction of the vehicle, the acceleration in the right-and-left direction of the vehicle, and the acceleration in the top-and-bottom direction of the vehicle are derivable from the output value from the acceleration sensor 32.

The inclination of the vehicle 300 relative to the gravitational acceleration vector G can be derived from the output value from the acceleration sensor 32 obtained while the vehicle is at rest. Specifically, a total angle θ including a road surface angle θr and a vehicle attitude angle θv is derivable from the output value from the acceleration sensor 32. The total angle θ is the angle of inclination of the vehicle 300 relative to the horizontal plane, the road surface angle θr is the angle of inclination of the road surface relative to the horizontal plane, and the vehicle attitude angle θv is the angle of inclination of the vehicle 300 relative to the road surface. The road surface angle θr, the vehicle attitude angle θv, and the total angle θ are angles in the pitch direction of the vehicle 300.

The self-leveling control aims to keep the forward range of the irradiation light to an optimum by absorbing a change in the forward range of the vehicle lamp 1 associated with a change in the angle of inclination of the vehicle 300 in the pitch direction. Therefore, the angle of inclination of the vehicle 300 required in the self-leveling control is the vehicle attitude angle θv. Specifically, in the self-leveling control, it is desirable that the optical axis angle θo of the vehicle lamp 1 be adjusted when the vehicle attitude angle θv has changed and that the optical axis angle θo of the vehicle lamp 1 be maintained when the road surface angle θr has changed. In order to achieve this, information on the vehicle attitude angle θv needs to be extracted from the total angle θ.

(Basic Control)

In this respect, the controlling unit 36 executes basic control of the self-leveling described below. In the basic control, the controlling unit 36 estimates that a change in the total angle θ observed while the vehicle is traveling is a change in the road surface angle θr and that a change in the total angle θ observed while the vehicle is at rest is a change in the vehicle attitude angle θv. Then, the controlling unit 36 derives the vehicle attitude angle θv from the total angle θ. While the vehicle is traveling, a change in the vehicle attitude angle θv caused by a change in the load or in the number of passengers rarely occurs, and thus it can be estimated that a change in the total angle θ observed while the vehicle is traveling is a change in the road surface angle θr. In addition, a change in the road surface angle θr caused by the movement of the vehicle 300 rarely occurs while the vehicle is at rest, and thus it can be estimated that a change in the total angle θ observed while the vehicle is at rest is a change in the vehicle attitude angle θv.

First, a predetermined initialization process is performed when the vehicle 300 is in a predetermined reference attitude on a predetermined reference road surface. Then, an initial setting value of the road surface angle θr and an initial setting value of the vehicle attitude angle θv are acquired in the initialization process, and these initial setting values are held in the RAM of the controlling unit 36 or in the memory 40. Specifically, for example, at a manufacturing plant of a vehicle manufacturer, a service facility of an auto dealer, or the like, the vehicle 300 is placed on a reference road surface designed such that the vehicle 300 lies parallel to the horizontal plane, and the attitude held in this case is set as the reference attitude. For example, the reference attitude is the attitude of the vehicle 300 in which either one occupant sits in the driver's seat or no occupant is in the vehicle 300. Then, an initialization signal is transmitted through a switch operation of an initialization processing device at the plant, communication over a Controller Area Network (CAN) system, or the like.

In response to receiving the initialization signal, the controlling unit 36 executes a predetermined initialization process. In this initialization process, an initial aiming adjustment is carried out, and the optical axis Ax of the vehicle lamp 1 is adjusted to an initial angle. Moreover, the angle calculating unit 36a stores, into the RAM, the output value from the acceleration sensor 32 obtained in the reference state as the initial setting value of the road surface angle θr (for example, θr=0°) and the initial setting value of the vehicle attitude angle θv (for example, θv=0°) and holds these initial setting values in a volatile state. Furthermore, the angle calculating unit 36a writes these initial setting values into the memory 40 and holds them in a non-volatile state.

In the basic control, the controlling unit 36 drives the total angle θ with the use of a plurality of output values from the acceleration sensor 32 and drives the leveling actuator 28 by outputting an adjustment signal instructing that the optical axis angle θo be adjusted in response to a change in the total angle θ observed while the vehicle is at rest. Moreover, the controlling unit 36 refrains from driving the leveling actuator 28 with respect to a change in the total angle θ observed while the vehicle is traveling.

The controlling unit 36 starts the self-leveling control with the use of the initial setting value of the vehicle attitude angle θv as the reference value of the vehicle attitude angle θv and with the use of the initial setting value of the road surface angle θr as the reference value of the road surface angle θr. Then, the controlling unit 36 holds, as a new reference value of the vehicle attitude angle θv, the vehicle attitude angle θv that is equal to the total of the amount of change in the total angle θ observed while the vehicle is at rest and the original reference value of the vehicle attitude angle θv. Moreover, the controlling unit 36 holds, as a new reference value of the road surface angle θr, the road surface angle θr that is equal to the total of the amount of change in the total angle θ observed while the vehicle is traveling and the original reference value of the road surface angle θr. In other words, the controlling unit 36 repeatedly updates the reference value of the road surface angle θr and the reference value of the vehicle attitude angle θv each time the vehicle 300 travels or stops.

For example, in a condition in which the vehicle 300 is actually used, the controlling unit 36 refrains from generating or outputting an adjustment signal instructing that the optical axis angle θo be adjusted with respect to a change in the total angle θ observed while the vehicle is traveling. Alternatively, the controlling unit 36 outputs a maintaining signal instructing that the optical axis angle θo be maintained with respect to such a change. This configuration makes it possible to keep the leveling actuator 28 from being driven. Then, the angle calculating unit 36a calculates the current total angle θ (held when the vehicle is stopping) from the plurality of output values from the acceleration sensor 32 when the vehicle is stopping. Thereafter, the angle calculating unit 36a obtains the road surface angle θr by subtracting the reference value of the vehicle attitude angle θv from the current total angle θ (θr=θ−θv reference value). This road surface angle θr is equal to the total of the amount of change in the total angle θ observed while the vehicle is traveling and the original reference value of the road surface angle θr.

The angle calculating unit 36a updates the held reference value of the road surface angle θr with the obtained road surface angle θr used as a new reference value of the road surface angle θr. Thus, the amount of change in the total angle θ observed while the vehicle is traveling that is estimated to be the amount of change in the road surface angle θr is incorporated into the reference value of the road surface angle θr.

Moreover, the controlling unit 36 drives the leveling actuator 28 by generating and outputting an adjustment signal for the optical axis angle θo with respect to a change in the total angle θ observed while the vehicle is at rest. Specifically, while the vehicle is at rest, the angle calculating unit 36a repeatedly calculates the current total angle θ at predetermined timings from a plurality of output values from the acceleration sensor 32. Then, the angle calculating unit 36a obtains the vehicle attitude angle θv by subtracting the reference value of the road surface angle θr from the current total angle θ (θv=θ−θr reference value). This vehicle attitude angle θv is equal to the total of the amount of change in the total angle θ observed while the vehicle is at rest and the original reference value of the vehicle attitude angle θv.

The angle calculating unit 36a updates the held reference value of the vehicle attitude angle θv with the obtained vehicle attitude angle θv used as a new reference value of the vehicle attitude angle θv. Thus, the amount of change in the total angle θ observed while the vehicle is at rest that is estimated to be the amount of change in the vehicle attitude angle θv is incorporated into the reference value of the vehicle attitude angle θv.

Then, the adjustment instructing unit 36b generates an adjustment signal for the optical axis angle θo with the use of either the calculated vehicle attitude angle θv or the updated new reference value of the vehicle attitude angle θv. For example, the adjustment instructing unit 36b determines the optical axis angle θo with the use of a conversion table, recorded in advance in the memory 40, that maps the values of the vehicle attitude angle θv to the values of the optical axis angle θo and generates the adjustment signal. The generated adjustment signal is output to the leveling actuator 28 from the transmitting unit 38.

When an ignition switch 314 is turned off, the controlling unit 36 records, into the memory 40, at least one of the reference value of the road surface angle θr held in the RAM or the reference value of the vehicle attitude angle θv held in the RAM. Thus, the reference value of the road surface angle θr and/or the reference value of the vehicle attitude angle θv can remain held even when the ignition switch 314 is turned off. The controlling unit 36 can determine that the ignition switch 314 has been turned off by either receiving an IG-OFF signal sent from the vehicle controlling ECU 302 or detecting that the power source voltage supplied to the controlling unit 36 has reached or fallen below a predetermined value.

A change in the road surface angle θr in association with the movement of the vehicle 300 rarely occurs when the ignition switch 314 is off. Therefore, a change in the total angle θ observed during a period from when the ignition switch 314 is turned off to when the ignition switch 314 is turned on can be estimated to be a change in the vehicle attitude angle θv. As such, when the ignition switch 314 shifts to an on state, as initial control after starting, the controlling unit 36 derives the current vehicle attitude angle θv with the use of the total angle θ obtained from a plurality of current output values from the acceleration sensor 32 and the reference value held in the memory 40.

In a case where the reference value of the road surface angle θr is held in the memory 40, the controlling unit 36 obtains the current vehicle attitude angle θv by subtracting the reference value of the road surface angle θr from the total angle θ obtained from a plurality of current output values from the acceleration sensor 32.

In a case where the reference value of the vehicle attitude angle θv is held in the memory 40, when the ignition switch 314 is turned off, the controlling unit 36 records, into the memory 40, the last total angle θ detected before the ignition switch 314 is turned off in addition to the reference value of the vehicle attitude angle θv. In the initial control after starting, the controlling unit 36 calculates a difference between the current total angle θ obtained from a plurality of current detection values from the acceleration sensor 32 and the last total angle θ detected before the ignition is turned off. Then, the controlling unit 36 calculates the current vehicle attitude angle θv by adding the obtained difference to the reference value of the vehicle attitude angle θv.

The controlling unit 36 holds, into the RAM, the obtained vehicle attitude angle θv as a new reference value. Moreover, the controlling unit 36 adjusts the optical axis Ax with the use of either the obtained vehicle attitude angle θv or the new reference value of the vehicle attitude angle θv. Thus, the change in the vehicle attitude angle θv observed while the ignition switch 314 is off can be incorporated into the reference value, and the optical axis angle θo can be adjusted to an appropriate position. Accordingly, the accuracy of the self-leveling control can be increased.

(Sampling Frequency of Acceleration Sensor 32)

Figure 4:
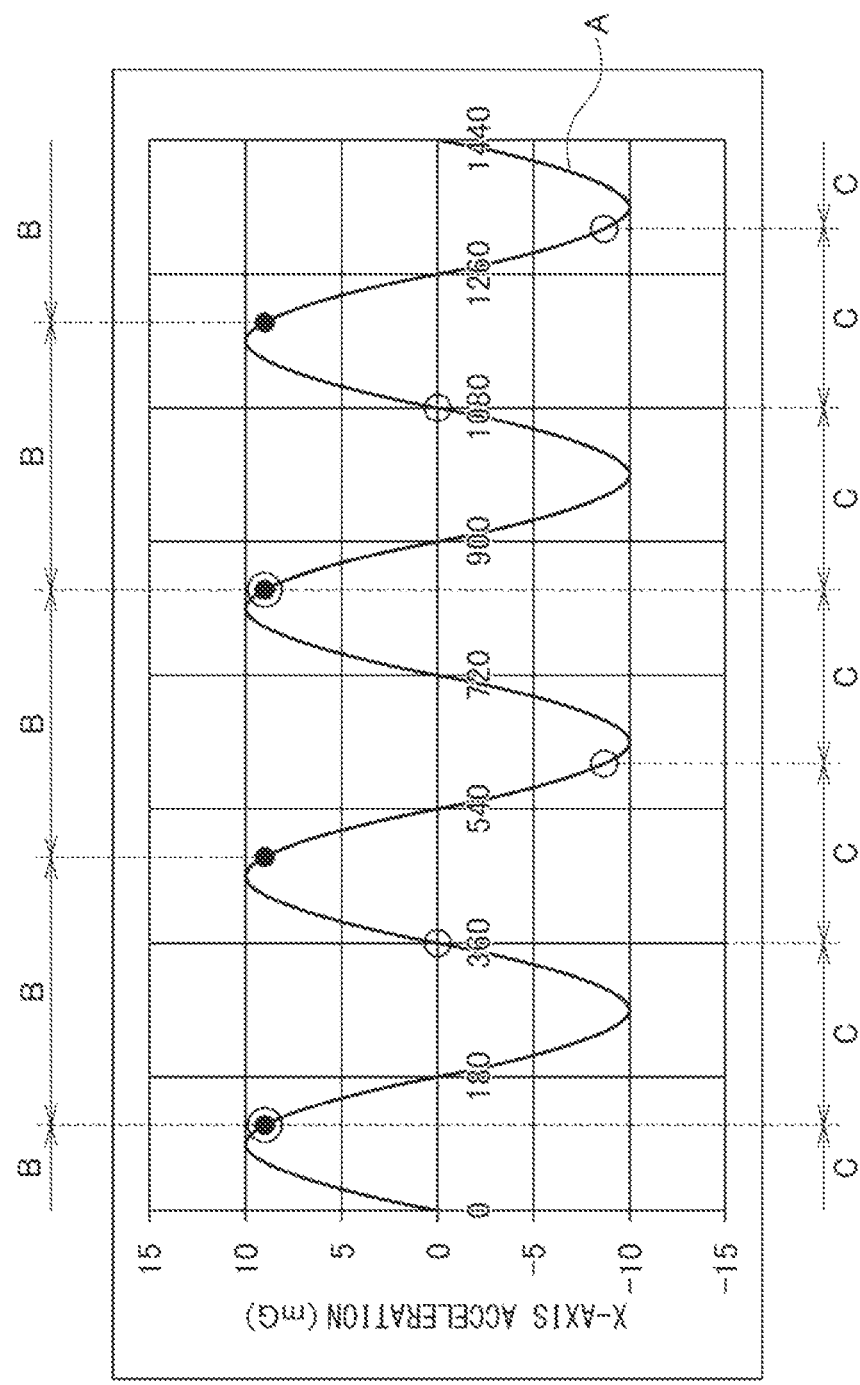
FIG. 4 illustrates a relationship between a sampling frequency of an acceleration sensor and a vibration frequency of a vibration generating source.

FIG. 4 illustrates a relationship between a sampling frequency of an acceleration sensor and a vibration frequency of a vibration generating source. The vehicle lamp 1 is often provided with a vibration generating source. The vibration generating source is, for example, the fan 20 for cooling a heat generating member provided in the vehicle lamp 1 (the light source 10, the heat sink 18, or the like according to the present embodiment). In addition, the vibration generating source is, for example, the rotary reflector 14 that rotates about the axis of rotation R while reflecting the light emitted from the light source 10. The fan 20 or the rotary reflector 14 vibrates at a predetermined first frequency when the center of gravity of the fan 20 or the rotary reflector 14 is off the axis of rotation. The first frequency is a frequency proportional to the number of rotations of the fan 20 or the rotary reflector 14. In other words, the vibration generating source generates a periodic vibration A of the first frequency.

Meanwhile, according to the present embodiment, the acceleration sensor 32 is also provided in the vehicle lamp 1. When the acceleration sensor 32 is provided in the vehicle lamp 1, the acceleration detected by the acceleration sensor 32 may also be included in the acceleration component resulting from the periodic vibration A. In this case, the accuracy in detecting the angle of inclination of the vehicle 300 may decrease.

An influence that the acceleration resulting from random vibrations, such as an impact input from the outside, has on detecting the angle of inclination of the vehicle 300 can be reduced by performing an averaging process on the plurality of output values from the acceleration sensor 32. Thus, the accuracy in detecting the angle of inclination can be increased. However, the averaging process may not be possible to reduce the influence of a vibration generating source that generates the periodic vibration A. In other words, when the sampling frequency of the acceleration sensor 32 (the frequency of the sampling cycles B) is an integral multiple of the first frequency of the periodic vibration A, the vibration-derived acceleration of the equal magnitude is added to all the output values from the acceleration sensor 32, as indicated by the filled circles in FIG. 4. In this case, the influence of the vibration generating source on detecting the angle of inclination cannot be reduced through the averaging process on the plurality of output values.

In this respect, the acceleration sensor 32 included in the leveling ECU 30 according to the present embodiment is configured to sample the acceleration at a second frequency (the frequency of the sampling cycles C) that is a non-integral multiple of the first frequency, as indicated by the open circles in FIG. 4. Thus, the magnitude of the vibration-derived acceleration to be added to each output value from the acceleration sensor 32 can be varied. As a result, an influence of the vibration generating source on detecting the angle of inclination can be reduced through the averaging process on the plurality of output values. In one example, the first frequency is either 51.33 Hz or 55.83 Hz, and the second frequency is 20 Hz.

FIG. 4 illustrates the acceleration component along the X-axis, and the same applies to the acceleration component along the Y-axis and the acceleration component along the Z-axis. However, the magnitude of the vibration-derived acceleration along each axial component that is input to the acceleration sensor 32 varies in accordance with the inclination of the axis of rotation of the fan 20 or the rotary reflector 14 relative to the three axes of the acceleration sensor 32.

Figure 5:
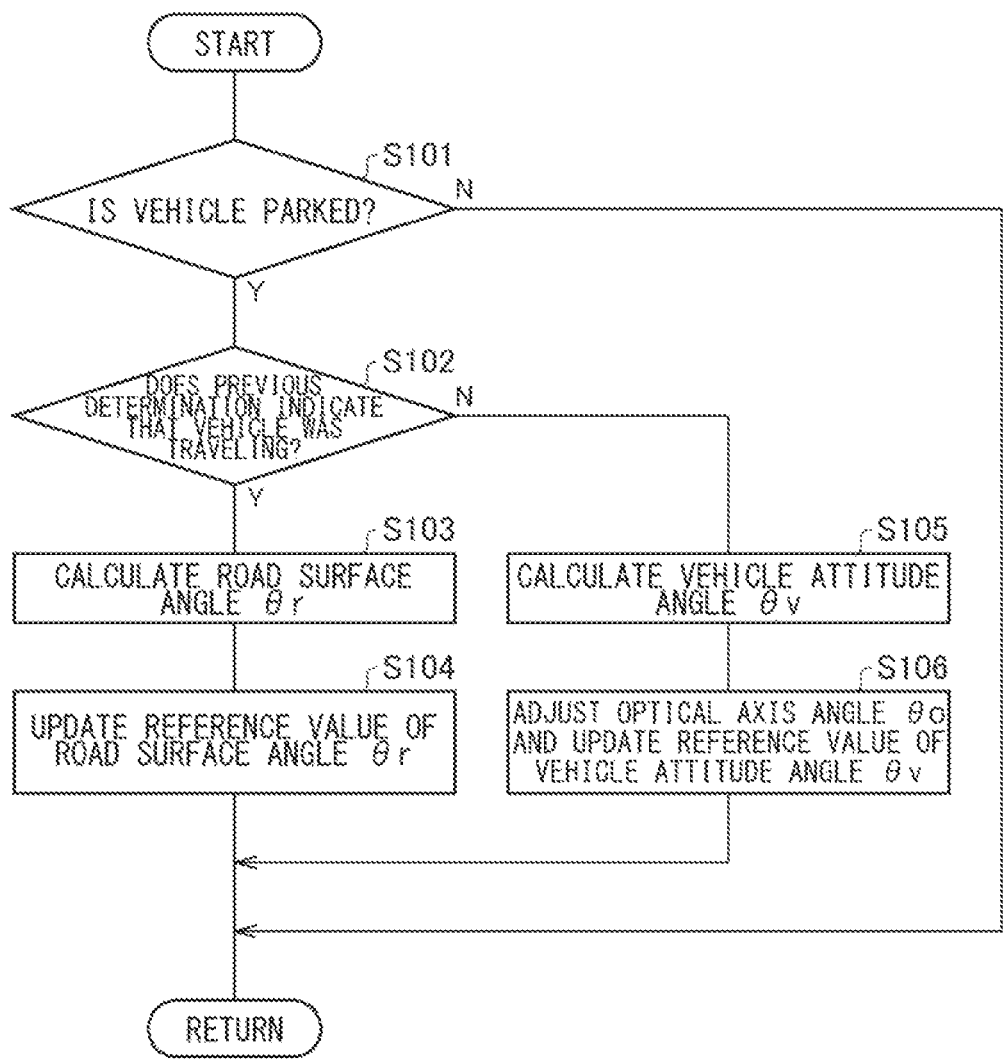
FIG. 5 is a flowchart illustrating an example of self-leveling control executed by a leveling ECU according to Embodiment 1.

FIG. 5 is a flowchart illustrating an example of self-leveling control executed by the leveling ECU according to Embodiment 1. This flow is executed repeatedly at predetermined timings by the controlling unit 36, for example, when the light switch 304 has instructed that the self-leveling control be executed and the ignition switch 314 is on. The flow is terminated when the instruction to execute the self-leveling control is canceled (or the termination is instructed) or the ignition switch 314 is turned off.

First, the controlling unit 36 determines whether the vehicle 300 is parked (S101). The controlling unit 36 can determine whether the vehicle 300 is parked on the basis of the output value from the vehicle speed sensor 308. If the vehicle 300 is not parked (N at S101), in other words, if the vehicle 300 is traveling, the controlling unit 36 terminates this routine. If the vehicle 300 is parked (Y at S101), the controlling unit 36 determines whether the vehicle 300 was traveling (N at S101) in the parking determination at S101 of the previous routine (S102). If the previous determination indicates that the vehicle 300 was traveling (Y at S102), which means that "the vehicle is stopping," the controlling unit 36 calculates the road surface angle θr by subtracting the reference value of the vehicle attitude angle θv from the current total angle θ (S103). Then, the controlling unit 36 updates the reference value of the road surface angle θr with the obtained road surface angle θr used as a new reference value of the road surface angle θr (S104) and terminates this routine.

If the previous determination indicates that the vehicle 300 was not traveling (N at S102), which means "the vehicle is at rest," the controlling unit 36 calculates the vehicle attitude angle θv by subtracting the reference value of the road surface angle θr from the current total angle θ (S105). Then, the controlling unit 36 adjusts the optical axis angle θo with the use of the obtained vehicle attitude angle θv and updates the reference value of the vehicle attitude angle θv with the obtained vehicle attitude angle θv used as a new reference value (S106). Then, the controlling unit 36 terminates this routine.

As described thus far, the leveling ECU 30 serving as the control device for the vehicle lamp 1 according to the present embodiment controls the adjustment of the optical axis angle θo of the vehicle lamp 1 provided with a vibration generating source that vibrates at a first frequency, and the leveling ECU 30 includes the acceleration sensor 32, the receiving unit 34, and the controlling unit 36. The acceleration sensor 32 is provided in the vehicle lamp 1 and configured in advance to sample the acceleration at a second frequency that is a non-integral multiple of the first frequency. The receiving unit 34 receives a signal indicating an output value from the acceleration sensor 32. The controlling unit 36 executes the control of adjusting the optical axis angle $\theta o$ of the vehicle lamp 1 on the basis of the output value from the acceleration sensor 32 that the receiving unit 34 has received.

In this manner, as the vehicle lamp 1 is provided with the acceleration sensor 32 having a sampling frequency (second frequency) that is a non-integral multiple of the vibration frequency (first frequency) of the vibration generating source, a negative influence that the vibration generating source has on detecting the angle of inclination of the vehicle 300 with the use of the acceleration sensor 32 can be reduced. Thus, the accuracy in detecting the angle of inclination of the vehicle 300 can be increased. Accordingly, the accuracy of the self-leveling control of the vehicle lamp 1 can be increased.

The vibration generating source provided in the vehicle lamp 1 is, for example but not limited to, the fan 20 for cooling a heat generating member, such as the light source 10, provided in the vehicle lamp 1 or the rotary reflector 14 that rotates about the axis of rotation R while reflecting the light L emitted from the light source 10. In other words, according to the present embodiment, the accuracy of the self-leveling control of the vehicle lamp 1 provided with the fan 20, the rotary reflector 14, or the like can be increased.

The controlling unit 36 according to the present embodiment holds the reference value of the road surface angle $\theta r$ and the reference value of the vehicle attitude angle $\theta v$. Then, with respect to a change in the total angle $\theta$ observed while the vehicle is at rest, the controlling unit 36 outputs an adjustment signal and also holds, as a new reference value of the vehicle attitude angle $\theta v$, the vehicle attitude angle $\theta v$ that is equal to the total of the amount of change in the total angle $\theta$ observed while the vehicle is at rest and the reference value of the vehicle attitude angle $\theta v$. Meanwhile, with respect to a change in the total angle $\theta$ observed while the vehicle is traveling, the controlling unit 36 either refrains from generating or outputting an adjustment signal or outputs a maintaining signal instructing that the optical axis angle $\theta o$ be maintained. Along with the above, the controlling unit 36 holds, as a new reference value of the road surface angle $\theta r$, the road surface angle $\theta r$ that is equal to the total of the amount of change in the total angle $\theta$ observed while the vehicle is traveling and the reference value of the road surface angle $\theta r$. Such control makes it possible to achieve the self-leveling control involving the acceleration sensor 32 through a simple control structure.

Thus far, Embodiment 1 according to the present invention has been described in detail. The embodiment described above merely illustrates a specific example for implementing the present invention. The content of the embodiment does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also valid as an aspect of the present invention. Hatching added along the sections in the drawings does not limit the material of those with hatching.

According to Embodiment 1, the vehicle attitude angle $\theta v$ is calculated by subtracting the reference value of the road surface angle $\theta r$ from the total angle $\theta$, and the road surface angle $\theta r$ is calculated by subtracting the reference value of the vehicle attitude angle $\theta v$ from the total angle $\theta$. However, there is no particular limitation to this configuration.

For example, the controlling unit 36 obtains the vehicle attitude angle $\theta v$ including the amount of change in the total angle $\theta$ observed while the vehicle is at rest by calculating a difference $\Delta\theta 1$ between the current total angle $\theta$ and the total angle $\theta$ calculated in the previous instance while the vehicle is at rest and by adding the difference $\Delta\theta 1$ to the reference value of the vehicle attitude angle $\theta v$ ($\theta v = \theta v$ reference value $+ \Delta\theta 1$). Moreover, the controlling unit 36 updates the reference value of the vehicle attitude angle $\theta v$ with the obtained vehicle attitude angle $\theta v$ used as a new reference value of the vehicle attitude angle $\theta v$. Thus, the amount of change in the total angle $\theta$ observed while the vehicle is at rest that is estimated to be the amount of change in the vehicle attitude angle $\theta v$ is incorporated into the reference value of the vehicle attitude angle $\theta v$. This control method enables self-leveling control that does not involve the reference value of the road surface angle $\theta r$. Accordingly, the self-leveling control can be simplified.

Moreover, for example, the controlling unit 36 holds the total angle $\theta$ held immediately before the vehicle starts traveling as the reference value of the total angle $\theta$ immediately after the vehicle 300 has started traveling and calculates a difference $\Delta\theta 2$ by subtracting the reference value of the total angle $\theta$ from the total angle $\theta$ held when the vehicle is stopping. Then, the controlling unit 36 obtains the road surface angle $\theta r$ including the amount of change in the total angle $\theta$ observed while the vehicle is traveling by adding the difference $\Delta\theta 2$ to the reference value of the road surface angle $\theta r$ ($\theta r = \theta r$ reference value $+ \Delta\theta 2$). Moreover, the controlling unit 36 updates the reference value of the road surface angle $\theta r$ with the obtained road surface angle $\theta r$ used as a new reference value of the road surface angle $\theta r$. Thus, the amount of change in the total angle $\theta$ observed while the vehicle is traveling that is estimated to be the amount of change in the road surface angle $\theta r$ is incorporated into the reference value of the road surface angle $\theta r$. Then, the controlling unit 36 obtains the vehicle attitude angle $\theta v$ including the amount of change in the total angle $\theta$ observed while the vehicle is at rest by subtracting the reference value of the road surface angle $\theta r$ from the total angle $\theta$ while the vehicle is at rest ($\theta v = \theta - \theta r$ reference value). This control method enables self-leveling control that does not involve the reference value of the vehicle attitude angle $\theta v$. Accordingly, the self-leveling control can be simplified.

Except where any technical misalignment occurs, holding a value obtained through a calculation involving a predetermined component includes holding the component used to calculate that value. For example, when the reference value of the road surface angle $\theta r$ is calculated by subtracting the reference value of the vehicle attitude angle $\theta v$ from the total angle $\theta$, holding the reference value of the road surface angle $\theta r$ includes holding the total angle $\theta$ and the reference value of the vehicle attitude angle $\theta v$ used in the calculation. Likewise, when the reference value of the vehicle attitude angle $\theta v$ is calculated by subtracting the reference value of the road surface angle θr from the total angle θ, holding the reference value of the vehicle attitude angle θv includes holding the total angle θ and the reference value of the road surface angle θr used in the calculation. Moreover, holding the total angle θ includes holding the output value from the acceleration sensor 32.

The invention according to Embodiment 1 described above may be identified through the items indicated below.

[Item 1]

A vehicle lamp system, comprising:
a vehicle lamp (1) with an adjustable optical axis (Ax); and
a control device (30) for the vehicle lamp (1).

[Item 2]

A control method for a vehicle lamp (1), the control method controlling an adjustment of an optical axis angle (θo) of the vehicle lamp (1) provided with a vibration generating source that vibrates at a first frequency, the control method comprising:
sampling, with an acceleration sensor (32) provided in the vehicle lamp (1), an acceleration at a second frequency that is a non-integral multiple of the first frequency; and
adjusting the optical axis angle (θo) of the vehicle lamp (1) on the basis of the sampled acceleration.

Embodiment 2

In the present specification, the expression "while a vehicle is traveling" refers, for example, to a period from when the output value from a vehicle speed sensor 308, which will be described later, has exceeded 0 to when the output value from the vehicle speed sensor 308 has returned to 0. The expression "when a vehicle is stopping" refers, for example, to a point when the output value from a tilt sensor 132, which will be described later, has stabilized after the output value from the vehicle speed sensor has become 0. The expression "while a vehicle is at rest" refers, for example, to a period from when the output value from the tilt sensor 132 has stabilized to when the output value from the vehicle speed sensor 308 has exceeded 0. The expression "when the output value has stabilized" may mean the time when an amount of change per unit time in the output value from the tilt sensor 132 has become no greater than a predetermined amount or may mean a point when a predetermined period has passed (for example, 1 to 2 seconds later) after the output value from the vehicle speed sensor 308 has become 0. The expression "a vehicle 300 is being parked" means that the vehicle 300 is in the state of either "when a vehicle is stopping" or "while a vehicle is at rest." The expression "immediately after a vehicle has started traveling" covers, for example, a predetermined period following when the output value from the vehicle speed sensor 308 has exceeded 0. The expression "immediately before a vehicle starts traveling" covers, for example, a time preceding, by a predetermined period, a point when the output value from the vehicle speed sensor 308 has exceeded 0. The expressions "while a vehicle is traveling," "when a vehicle is stopping," "while a vehicle is at rest," "when the output value has stabilized," "immediately after a vehicle has started traveling," "immediately before a vehicle starts traveling," "a predetermined amount," and "a predetermined period" described above can be set as appropriate on the basis of an experiment or a simulation conducted by a designer.

Figure 6:
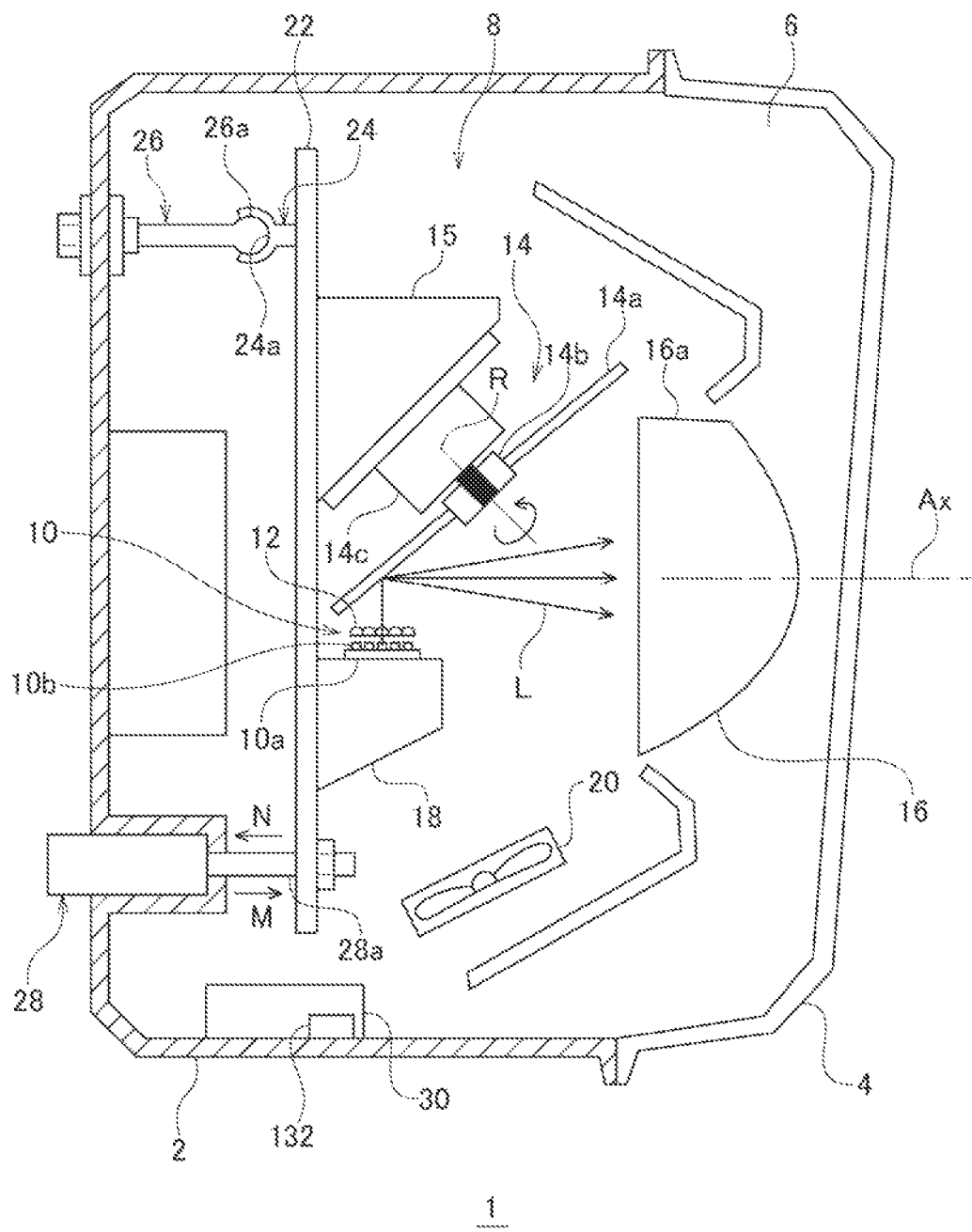
FIG. 6 is a vertical sectional view of a vehicle lamp according to Embodiment 2.

FIG. 6 is a vertical sectional view of a vehicle lamp according to Embodiment 2. A vehicle lamp 1 according to the present embodiment is a vehicle headlamp that includes a pair of headlamp units formed symmetrically along the right-and-left direction. These two headlamp units are disposed right and left ends of a vehicle in its widthwise direction. The right-side headlamp unit and the left-side headlamp unit have substantially identical configurations. Therefore, only the structure of one of the headlamp units will be described below as a structure of the vehicle lamp 1, and the description of the structure of the other headlamp unit will be omitted.

The vehicle lamp 1 includes a lamp body 2 and a light-transmissive cover 4. The lamp body 2 has a recess portion that opens in the front direction of the vehicle. The light-transmissive cover 4 covers the opening of the lamp body 2. The lamp body 2 and the light-transmissive cover 4 form a lamp room 6. The lamp room 6 houses an optical unit 8.

The optical unit 8 includes a light source 10, a condenser lens 12, a rotary reflector 14, a projection lens 16, and a heat sink 18. The light source 10 has a structure in which a plurality of light emitting elements 10b are arranged in an array on a circuit board 10a. Each light emitting element 10b is configured to be capable of being turned on or off independently. A semiconductor light emitting element, such as an LED, an EL, or an LD, can be used as each light emitting element 10b. Alternatively, the light source 10 may be implemented by, for example but not limited to, an incandescent lamp, a halogen lamp, or a discharge lamp.

The condenser lens 12 is an optical member that directs light L emitted from the light source 10 toward a blade 14a of the rotary reflector 14 by changing the optical path of the light L. The rotary reflector 14 is an optical member that rotates about an axis of rotation R while reflecting the light L emitted from the light source 10. The rotary reflector 14 includes a plurality of blades 14a, a rotary cylinder 14b, and a motor 14c that serves as a driving source. The plurality of blades 14a function as a surface for reflecting the light L and are fixed to a peripheral surface of the rotary cylinder 14b. The attitude of the rotary cylinder 14b is set such that a center axis of the cylinder coincides with an output shaft of the motor 14c, and the rotary cylinder 14b is fixed to the output shaft of the motor 14c. The output shaft of the motor 14c and the center axis of the rotary cylinder 14b coincide with the axis of rotation R of the rotary reflector 14.

Upon the motor 14c being driven, the blades 14a turn in one direction about the axis of rotation R. The blades 14a reflect the light L while turning and thus scan the light L toward the space in front of the lamp. With this configuration, a desired light-distribution pattern can be formed in the space in front of the lamp. For example, through a combination of the on/off of the light source 10 and the rotation of the rotary reflector 14, the optical unit 8 can form a high-beam light-distribution pattern having a shaded portion that lies in a region where an oncoming vehicle in front of the host vehicle is present.

The projection lens 16 is an optical member that projects the light L reflected by the rotary reflector 14 toward the space in front of the lamp. The projection lens 16 is constituted, for example, by a plano-convex aspherical lens. The shape of the projection lens 16 can be selected, as appropriate, in accordance with a required light-distribution pattern or light-distribution characteristics such as the luminous intensity distribution. The projection lens 16 according to the present embodiment includes a cut-out portion 16a at a portion of its outer periphery. The presence of the cut-out portion 16a can help reduce the likelihood that the blades 14a of the rotary reflector 14 interfere with the projection lens 16 and allows the projection lens 16 and the rotary reflector 14 to be disposed closer to each other.

The heat sink 18 is a member for cooling the light source 10. The heat sink 18 is disposed opposite the rotary reflector 14 across the light source 10. The light source 10 is fixed to the heat sink 18 on its surface that faces the rotary reflector 14. The light source 10 is cooled as the heat from the light source 10 is conducted to the heat sink 18. The lamp room 6 further houses a fan 20. The fan 20 is fixed to the lamp body 2 via a support mechanism (not illustrated) and blows an air toward the heat sink 18. This can accelerate the heat dissipation from the heat sink 18 and help further cool the light source 10.

The optical unit 8 is supported by the lamp body 2 via a lamp bracket 22. The lamp bracket 22 is, for example, a plate-like member having principal surfaces and is disposed with the principal surfaces facing the front-and-back direction of the lamp. The optical unit 8 is fixed to the one of the principal surfaces that faces the front direction of the lamp. The light source 10 is fixed to the lamp bracket 22 via the heat sink 18. The rotary reflector 14 is fixed to the lamp bracket 22 via a pedestal 15. The projection lens 16 is fixed to the lamp bracket 22 via a lens holder (not illustrated).

The lamp bracket 22 includes a joint receiver 24 provided at an upper end portion of the principal surface that faces the back direction of the lamp. The joint receiver 24 projects in the back direction of the lamp. A shaft 26 is coupled to the joint receiver 24, and the shaft 26 penetrates through a wall of the lamp body 2 and extends in the front direction of the lamp. A ball portion 26a for a ball joint is provided at a leading end of the shaft 26. A ball-shaped space 24a that follows the shape of the ball portion 26a for a ball joint is provided in the joint receiver 24. The joint receiver 24 and the shaft 26 become coupled to each other as the ball portion 26a for a ball joint is fitted into the ball-shaped space 24a.

A leveling actuator 28 is coupled to the lamp bracket 22 at a lower end portion of the principal surface that faces the back direction of the lamp. The leveling actuator 28 is constituted, for example, by a motor that causes a rod 28a to extend or contract in the direction indicated by arrows M and N. A leading end of the rod 28a is fixed to the lamp bracket 22. When the rod 28a is extended in the direction of the arrow M, the optical unit 8 becomes displaced about the fulcrum served by an engagement portion where the joint receiver 24 and the shaft 26 engage with each other, and assumes a backward tilted attitude. Meanwhile, when the rod 28a is contracted in the direction of the arrow N, the optical unit 8 becomes displaced about the fulcrum served by the stated engagement portion and assumes a forward tilted attitude. Accordingly, driving the leveling actuator 28 enables the leveling adjustment with which the pitch angle of an optical axis Ax of the vehicle lamp 1 is directed upward or downward. It is to be noted that the structure of the optical unit 8 itself, the support structure of the optical unit 8, and so on are not limited to those described above.

The lamp room 6 further houses a leveling ECU 30 and the tilt sensor 132 that function as a control device for a vehicle lamp according to the present embodiment. Now, the leveling ECU 30 and the tilt sensor 132 will be described in detail.

Figure 7:
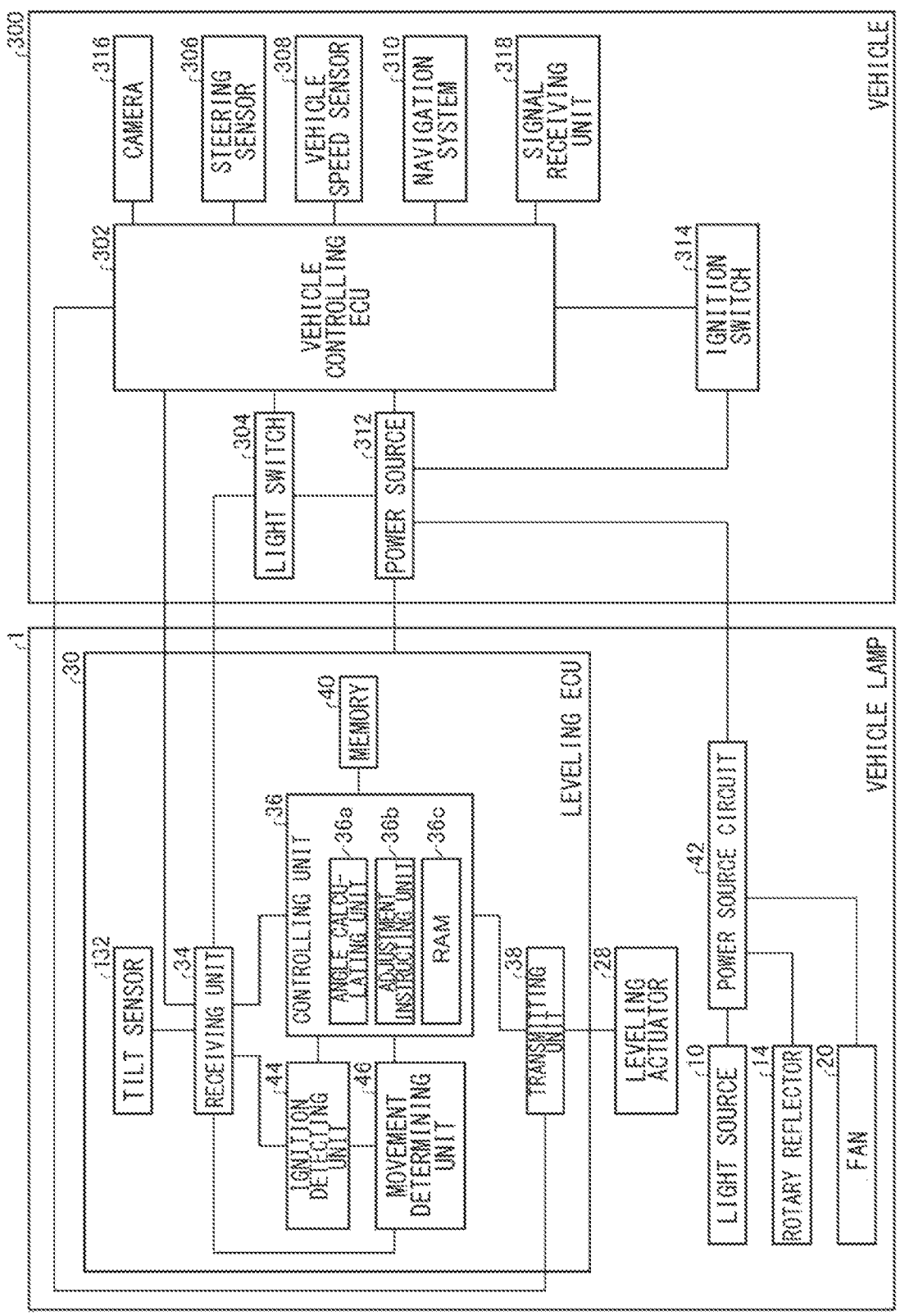
FIG. 7 is a functional block diagram illustrating cooperation of a vehicle lamp, a leveling ECU, and a vehicle controlling ECU.

FIG. 7 is a functional block diagram illustrating cooperation of a vehicle lamp, a leveling ECU, and a vehicle controlling ECU. The leveling ECU 30 and a vehicle controlling ECU 302 are implemented, in terms of their hardware configuration, by elements such as a CPU and a memory of a computer or circuits and implemented, in terms of their software configuration, by a computer program or the like. The leveling ECU 30 and the vehicle controlling ECU 302 are depicted in FIG. 7 as functional blocks implemented through cooperation of the above. It is to be appreciated by a person skilled in the art that these functional blocks can be implemented in a variety of forms through combinations of hardware and software.

The leveling ECU 30 includes the tilt sensor 132, the receiving unit 34, the controlling unit 36, the transmitting unit 38, the memory 40 (storage), an ignition detecting unit 44, and a movement determining unit 46. The tilt sensor 132 according to the present embodiment is provided in the vehicle lamp 1 with the tilt sensor 132 mounted on a circuit board of the leveling ECU 30. However, there is no particular limitation to this configuration, and the tilt sensor 132 may be mounted on another circuit board separate from the leveling ECU 30. The leveling ECU 30 and the tilt sensor 132 may each be disposed inside the vehicle 300, for example, in the vicinity of the dashboard or the like. Alternatively, one of the leveling ECU 30 and the tilt sensor 132 may be disposed inside the vehicle lamp 1, and the other one of the leveling ECU 30 and the tilt sensor 132 may be disposed inside the vehicle 300.

The vehicle controlling ECU 302 and a light switch 304, which are provided in the vehicle 300, are connected to the leveling ECU 30. A signal output from the vehicle controlling ECU 302 or the light switch 304 is received by the receiving unit 34. The receiving unit 34 also receives a signal indicating an output value from the tilt sensor 132.

The steering sensor 306, the vehicle speed sensor 308, the navigation system 310 provided with a GPS, the ignition switch 314, a camera 316 that captures an image of the surroundings of the vehicle 300, a signal receiving unit 318, and so on, which are each provided in the vehicle 300, are connected to the vehicle controlling ECU 302. Signals output from these elements are received by the receiving unit 34 via the vehicle controlling ECU 302, as necessary. The signal receiving unit 318 receives, from the outside, a signal for identifying whether the vehicle 300 is on the market or at a plant (hereinafter, referred to as an identification signal, as appropriate) or information regarding an object or objects in the surroundings of the vehicle 300 (hereinafter, referred to as object information, as appropriate).

An example of the identification signal is a signal that is transmitted from a facility at a plant while the vehicle 300 is at a manufacturing plant of the vehicle manufacturer and that is for setting the leveling ECU 30 or the vehicle controlling ECU 302 to a plant mode. Another example of the identification signal is a signal that is transmitted from a facility of an auto dealer while the vehicle 300 is at the auto dealer and that is for setting the leveling ECU 30 or the vehicle controlling ECU 302 to a market mode. The plant mode is a mode set mainly when the vehicle 300 is at a plant (including the period in which the vehicle 300 is transported from the plant to an auto dealer). In other words, the plant mode is a mode set in a situation in which the vehicle 300 is not for use by a user. The market mode is a mode set mainly when the vehicle 300 is at other than a plant. In other words, the market mode is a mode set in a situation in which the vehicle 300 is for use by a user. An example of the object information is a signal indicating position information when, for example, the position information is sent from a traffic signal, a streetlight, a monitoring camera, or the like present in the surroundings of the vehicle 300. The object information includes, aside from the information received by the signal receiving unit 318, image information captured by the camera 316.

The light switch 304 transmits, to the vehicle controlling ECU 302 or the leveling ECU 30, a signal for controlling the on/off state of the vehicle lamp 1, a signal for instructing that the self-leveling control be executed, and so on in accordance with the content of an operation performed by the driver. Moreover, the light switch 304 transmits a signal to a power source 312 provided in the vehicle 300.

A signal that the receiving unit 34 has received is transmitted to the controlling unit 36. The controlling unit 36 calculates the pitch angle of the optical axis Ax of the vehicle lamp 1 suitable for the attitude of the vehicle 300 on the basis of the output value from the tilt sensor 132 (this angle is referred to below as an optical axis angle θo, as appropriate). In other words, the controlling unit 36 calculates the optical axis angle θo that the vehicle lamp 1 should hold. Then, the controlling unit 36 adjusts the current optical axis angle θo so that the optical axis angle θo approaches the calculated optical axis angle θo. The term "approach" encompasses a case where the current optical axis angle θo of the vehicle lamp 1 coincides with the calculated optical axis angle θo. The controlling unit 36 can operate as the integrated circuit constituting the controlling unit 36 executes a program held in a RAM 36c, which is a volatile memory, or in the memory 40, which is a non-volatile memory.

The controlling unit 36 includes the angle calculating unit 36a, the adjustment instructing unit 36b, and the RAM 36c. The angle calculating unit 36a generates pitch angle information of the vehicle 300 with the use of the output value from the tilt sensor 132 and, as necessary, information held in the RAM 36c or the memory 40. For example, the angle calculating unit 36a holds, in the RAM 36c, the output value from the tilt sensor 132 transmitted from the receiving unit 34. In response to the number of the acquired output values reaching a predetermined number, the angle calculating unit 36a performs an averaging process on the acquired plurality of output values and derives the pitch angle of the vehicle 300 on the basis of the output value obtained through the averaging process.

The adjustment instructing unit 36b determines the optical axis angle θo that the vehicle lamp 1 should hold on the basis of the pitch angle information generated by the angle calculating unit 36a. Then, the adjustment instructing unit 36b generates an adjustment signal instructing that the optical axis angle θo be adjusted. The adjustment instructing unit 36b outputs the generated adjustment signal to the leveling actuator 28 via the transmitting unit 38. The leveling actuator 28 is driven on the basis of the received adjustment signal, and thus the optical axis Ax of the vehicle lamp 1 is adjusted with respect to the pitch angle direction.

The ignition detecting unit 44 can detect the on or off of the ignition switch 314 by receiving, from the ignition switch 314 via the vehicle controlling ECU 302, a signal indicating that the ignition switch 314 is to shift to an on state or an off state. Alternatively, the ignition detecting unit 44 can detect the shift of the ignition switch 314 to an on state or an off state by monitoring the voltage supplied from the power source 312. The ignition detecting unit 44 transmits, to the controlling unit 36 or the movement determining unit 46, a signal indicating that the ignition switch 314 is to shift to an on state or an off state.

The movement determining unit 46 determines whether the vehicle 300 has moved while the ignition switch 314 in an off state. The movement determining unit 46 can determine whether the vehicle 300 has moved while the ignition switch 314 is off on the basis of any one or more of the position information of the vehicle 300, the identification signal, and the object information. In one example of a case where it is determined whether the vehicle has moved on the basis of various types of information or signals, it is determined that the vehicle has moved when at least one piece of information used or at least one signal used indicates that the vehicle has moved even if the remaining piece or pieces of information used or the remaining signal or signals indicate that the vehicle has not moved.

The movement determining unit 46 can acquire the position information of the vehicle 300 by receiving a signal from the navigation system 310 via the vehicle controlling ECU 302. Moreover, the movement determining unit 46 can receive an identification signal from the signal receiving unit 318 via the vehicle controlling ECU 302. Furthermore, the movement determining unit 46 can receive a signal indicating object information from the signal receiving unit 318 or the camera 316 via the vehicle controlling ECU 302. An operation of each unit included in the leveling ECU 30 will be described later in detail.

The vehicle 300 is provided with the power source 312 that supplies power to the leveling ECU 30, the vehicle controlling ECU 302, and a power source circuit 42 of the vehicle lamp 1. Upon the light switch 304 being operated to instruct that the vehicle lamp 1 be turned on, power is supplied from the power source 312 to the light source 10 via the power source circuit 42. The power source circuit 42 further supplies power to the rotary reflector 14 and the fan 20, as necessary. The power is supplied from the power source 312 to the leveling ECU 30 when an ignition switch 314 is on and is shut off when the ignition switch 314 is off.

(Self-Leveling Control)

Figure 8:
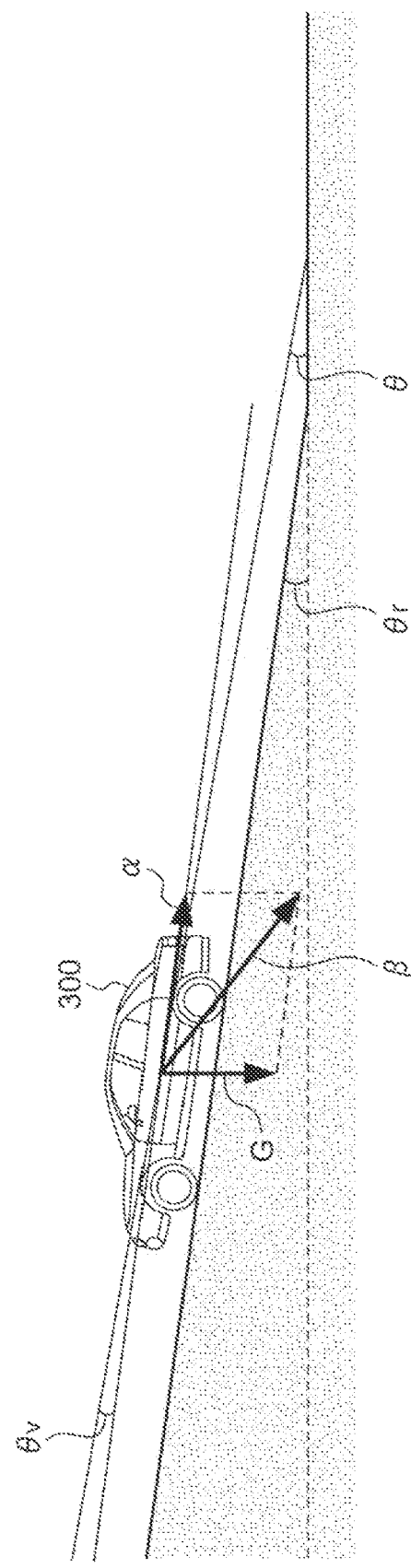
FIG. 8 is a schematic diagram for describing an acceleration vector produced in a vehicle and an angle of inclination of the vehicle that can be detected by a tilt sensor.

Next, self-leveling control executed by the leveling ECU 30 configured as described above will be described in detail. FIG. 8 is a schematic diagram for describing an acceleration vector produced in a vehicle and an angle of inclination of the vehicle that can be detected by a tilt sensor.

For example, when luggage is in the trunk in the back side of the vehicle or when a passenger is in the backseat, the vehicle has a backward tilted attitude. Meanwhile, when luggage is removed from the trunk or when a passenger in the backseat gets out of the vehicle, the vehicle enters a more forward tilted state than that of the backward tilted attitude. When the vehicle 300 has a backward tilted attitude or a forward tilted attitude, the direction in which the vehicle lamp 1 shines varies in the top-and-bottom direction accordingly, and the forward range increases or decreases. Thus, the leveling ECU 30 derives either the angle of inclination of the vehicle 300 in the pitch direction or an amount of change in the angle of inclination from the output value from the tilt sensor 132 and brings the optical axis angle θo to the angle corresponding to the attitude of the vehicle. Carrying out the self-leveling control of adjusting the leveling of the vehicle lamp 1 in real time on the basis of the attitude of the vehicle makes it possible to adjust the range of the forward irradiation light to an optimum even when the attitude of the vehicle changes.

According to the present embodiment, the tilt sensor 132 is, for example, a triaxial acceleration sensor having an X-axis, a Y-axis, and a Z-axis that are orthogonal to one another. The tilt sensor 132 is attached to the vehicle 300 at a desired posture and detects the acceleration vector produced in the vehicle 300. The gravitational acceleration and the motion acceleration produced through the movement of the vehicle 300 are produced in the traveling vehicle 300. Therefore, as illustrated in FIG. 8, the tilt sensor 132 can detect a composite acceleration vector β in which the gravitational acceleration vector G and the motion acceleration vector α are combined. In addition, while the vehicle 300 is at rest, the tilt sensor 132 can detect the gravitational acceleration vector G. The tilt sensor 132 outputs the numerical value of each of the axial components of the detected acceleration vector.

Since the tilt sensor 132 is attached to the vehicle lamp 1 at a desired posture, the X-axis, the Y-axis, and the Z-axis of the tilt sensor 132 (the axes of the sensor) held in the state in which the tilt sensor 132 is mounted in the vehicle lamp 1 do not necessarily coincide with the front-and-back axis, the right-and-left axis, and the top-and-bottom axis of the vehicle 300 (the axes of the vehicle) that determine the attitude of the vehicle 300. Therefore, the controlling unit 36 needs to convert the components on the three axes output from the tilt sensor 132, or in other words, the components on the sensor coordinate system into the components on the three axes of the vehicle 300, or in other words, into the components on the vehicle coordinate system.

The leveling ECU 30 holds in advance reference axis information indicating a positional relationship among the axes of the tilt sensor 132 held in a state in which the tilt sensor 132 is attached to the vehicle lamp 1, the axes of the vehicle 300, and the road surface angle. For example, as the reference axis information, the leveling ECU 30 holds, in the memory 40, a conversion table that maps the numerical value of each axial component in the output value from the tilt sensor 132 to the numerical value of each axial component of the vehicle 300. The angle calculating unit 36a acquires the numerical value of each of the X-axis component, the Y-axis component, and the Z-axis component output from the tilt sensor 132. Then, the angle calculating unit 36a converts the result of the averaging process into a front-and-back axis component, a right-and-left axis component, and a top-and-bottom axis component of the vehicle 300 with the use of the reference axis information. Thus, the acceleration in the front-and-back direction of the vehicle, the acceleration in the right-and-left direction of the vehicle, and the acceleration in the top-and-bottom direction of the vehicle are derivable from the output value from the tilt sensor 132.

The inclination of the vehicle 300 relative to the gravitational acceleration vector G can be derived from the output value from the tilt sensor 132 obtained while the vehicle is at rest. Specifically, a total angle θ including a road surface angle θr and a vehicle attitude angle θv is derivable from the output value from the tilt sensor 132. The total angle θ is the angle of inclination of the vehicle 300 relative to the horizontal plane, the road surface angle θr is the angle of inclination of the road surface relative to the horizontal plane, and the vehicle attitude angle θv is the angle of inclination of the vehicle 300 relative to the road surface. The road surface angle θr, the vehicle attitude angle θv, and the total angle θ are angles in the pitch direction of the vehicle 300.

The self-leveling control aims to keep the forward range of the irradiation light to an optimum by absorbing a change in the forward range of the vehicle lamp 1 associated with a change in the angle of inclination of the vehicle 300 in the pitch direction. Therefore, the angle of inclination of the vehicle 300 required in the self-leveling control is the vehicle attitude angle θv. Specifically, in the self-leveling control, it is desirable that the optical axis angle θo of the vehicle lamp 1 be adjusted when the vehicle attitude angle θv has changed and that the optical axis angle θo of the vehicle lamp 1 be maintained when the road surface angle θr has changed. In order to achieve this, information on the vehicle attitude angle θv needs to be extracted from the total angle θ.

(Basic Control)

In this respect, the controlling unit 36 executes basic control of the self-leveling described below. In the basic control, the controlling unit 36 estimates that a change in the total angle θ observed while the vehicle is traveling is a change in the road surface angle θr and that a change in the total angle θ observed while the vehicle is at rest is a change in the vehicle attitude angle θv. Then, the controlling unit 36 derives the vehicle attitude angle θv from the total angle θ. While the vehicle is traveling, a change in the vehicle attitude angle θv caused by a change in the load or in the number of passengers rarely occurs, and thus it can be estimated that a change in the total angle θ observed while the vehicle is traveling is a change in the road surface angle θr. In addition, a change in the road surface angle θr caused by the movement of the vehicle 300 rarely occurs while the vehicle is at rest, and thus it can be estimated that a change in the total angle θ observed while the vehicle is at rest is a change in the vehicle attitude angle θv.

First, a predetermined initialization process is performed when the vehicle 300 is in a predetermined reference attitude on a predetermined reference road surface. Then, an initial setting value of the road surface angle θr and an initial setting value of the vehicle attitude angle θv are acquired in the initialization process, and these initial setting values are held in the RAM 36c or the memory 40. Specifically, for example, at a manufacturing plant of a vehicle manufacturer, a service facility of an auto dealer, or the like, the vehicle 300 is placed on a reference road surface designed such that the vehicle 300 lies parallel to the horizontal plane, and the attitude held in this case is set as the reference attitude. For example, the reference attitude is the attitude of the vehicle 300 in which either one occupant sits in the driver's seat or no occupant is in the vehicle 300. Then, an initialization signal is transmitted through a switch operation of an initialization processing device at the plant, communication over a Controller Area Network (CAN) system, or the like.

In response to receiving the initialization signal, the controlling unit 36 executes a predetermined initialization process. For example, the initialization process is executed in a state in which the leveling ECU 30 is set to the plant mode. In this initialization process, an initial aiming adjustment is carried out, and the optical axis Ax of the vehicle lamp 1 is adjusted to an initial angle. Moreover, the angle calculating unit 36a stores, into the RAM 36c, the output value from the tilt sensor 132 obtained in the reference state as the initial setting value of the road surface angle θr (for example, θr=0°) and the initial setting value of the vehicle attitude angle θv (for example, θv=0°) and holds these initial setting values in a volatile state. Furthermore, the angle calculating unit 36a writes these initial setting values into the memory 40 and holds them in a non-volatile state.

In the basic control, the controlling unit 36 drives the total angle θ with the use of the output value from the tilt sensor 132 and drives the leveling actuator 28 by outputting an adjustment signal instructing that the optical axis angle θo be adjusted in response to a change in the total angle θ observed while the vehicle is at rest. Moreover, the controlling unit 36 refrains from driving the leveling actuator 28 with respect to a change in the total angle θ observed while the vehicle is traveling.

The controlling unit 36 starts the self-leveling control with the use of the initial setting value of the vehicle attitude angle θv as the reference value of the vehicle attitude angle θv and with the use of the initial setting value of the road surface angle θr as the reference value of the road surface angle θr. Then, with respect to a change in the total angle θ observed while the vehicle is at rest, the controlling unit 36 holds, as a new reference value of the vehicle attitude angle θv, the vehicle attitude angle θv that is equal to the total of the amount of change in the total angle θ observed while the vehicle is at rest and the original reference value of the vehicle attitude angle θv. Moreover, with respect to a change in the total angle θ observed while the vehicle is traveling, the controlling unit 36 holds, as a new reference value of the road surface angle θr, the road surface angle θr that is equal to the total of the amount of change in the total angle θ observed while the vehicle is traveling and the original reference value of the road surface angle θr. In other words, the controlling unit 36 repeatedly updates the reference value of the road surface angle θr and the reference value of the vehicle attitude angle θv each time the vehicle 300 travels or stops.

For example, in a condition in which the vehicle 300 is actually used, the controlling unit 36 refrains from generating or outputting an adjustment signal instructing that the optical axis angle θo be adjusted with respect to a change in the total angle θ observed while the vehicle is traveling. Alternatively, the controlling unit 36 outputs a maintaining signal instructing that the optical axis angle θo be maintained with respect to such a change. This configuration makes it possible to keep the leveling actuator 28 from being driven. Then, the angle calculating unit 36a calculates the current total angle θ (held when the vehicle is stopping) from the output value from the tilt sensor 132 when the vehicle is stopping. Thereafter, the angle calculating unit 36a obtains the road surface angle θr by subtracting the reference value of the vehicle attitude angle θv from the current total angle θ (θr=θ−θv reference value). This road surface angle θr is equal to the total of the amount of change in the total angle θ observed while the vehicle is traveling and the original reference value of the road surface angle θr.

The angle calculating unit 36a updates the held reference value of the road surface angle θr with the obtained road surface angle θr used as a new reference value of the road surface angle θr. Thus, the amount of change in the total angle θ observed while the vehicle is traveling that is estimated to be the amount of change in the road surface angle θr is incorporated into the reference value of the road surface angle θr. Here, the angle calculating unit 36a may obtain the road surface angle θr including the amount of change in the total angle θ observed while the vehicle is traveling by calculating a difference Δθ1 in the total angle θ between before and after the vehicle travels when the vehicle is stopping and by adding the difference Δθ1 to the reference value of the road surface angle θr (θr=θr reference value+Δθ1). For example, the angle calculating unit 36a can hold the total angle θ held immediately before the vehicle starts traveling as the reference value of the total angle θ immediately after the vehicle has started traveling and calculate the difference Δθ1 by subtracting the reference value of the total angle θ from the total angle θ held when the vehicle is stopping.

Moreover, while the vehicle is at rest, the angle calculating unit 36a repeatedly calculates the current total angle θ at predetermined timings from the output value from the tilt sensor 132. Then, the angle calculating unit 36a obtains the vehicle attitude angle θv by subtracting the reference value of the road surface angle θr from the current total angle θ (θv=θ−θr reference value). This vehicle attitude angle θv is equal to the total of the amount of change in the total angle θ observed while the vehicle is at rest and the original reference value of the vehicle attitude angle θv.

The angle calculating unit 36a updates the held reference value of the vehicle attitude angle θv with the obtained vehicle attitude angle θv used as a new reference value of the vehicle attitude angle θv. Thus, the amount of change in the total angle θ observed while the vehicle is at rest that is estimated to be the amount of change in the vehicle attitude angle θv is incorporated into the reference value of the vehicle attitude angle θv. Here, the angle calculating unit 36a may obtain the vehicle attitude angle θv including the amount of change in the total angle θ observed while the vehicle is at rest by calculating a difference Δθ2 between the current total angle θ and the total angle θ calculated in the previous instance while the vehicle is at rest and by adding the difference Δθ2 to the reference value of the vehicle attitude angle θv (θv=θv reference value+Δθ2).

Then, the adjustment instructing unit 36b generates an adjustment signal for the optical axis angle θo with the use of either the calculated vehicle attitude angle θv or the updated new reference value of the vehicle attitude angle θv. For example, the adjustment instructing unit 36b determines the optical axis angle θo with the use of a conversion table, recorded in advance in the memory 40, that maps the values of the vehicle attitude angle θv to the values of the optical axis angle θo and generates the adjustment signal. The generated adjustment signal is output to the leveling actuator 28 from the transmitting unit 38.

(Correction Process)

As described above, in the basic control of self-leveling, the reference value of either the vehicle attitude angle θv or the road surface angle θr is subtracted from the total angle θ, and the reference value is thus updated repeatedly. Alternatively, the difference Δθ1 of the change in the total angle θ is added to the reference value of the road surface angle θr, the difference Δθ2 is added to the reference value of the vehicle attitude angle θv, and thus the reference value is updated repeatedly. With this configuration, the change in the road surface angle θr and the change in the vehicle attitude angle θv are taken into the respective reference values. When the reference value of the road surface angle θr and the reference value of the vehicle attitude angle θv are overwritten repeatedly in this manner, the detection error or the like of the tilt sensor 132 accumulates in the reference values, and the accuracy of the self-leveling control may decrease. Accordingly, the leveling ECU 30 executes the control described below as a correction process of correcting the reference value and the optical axis angle θo.

Figure 9A:
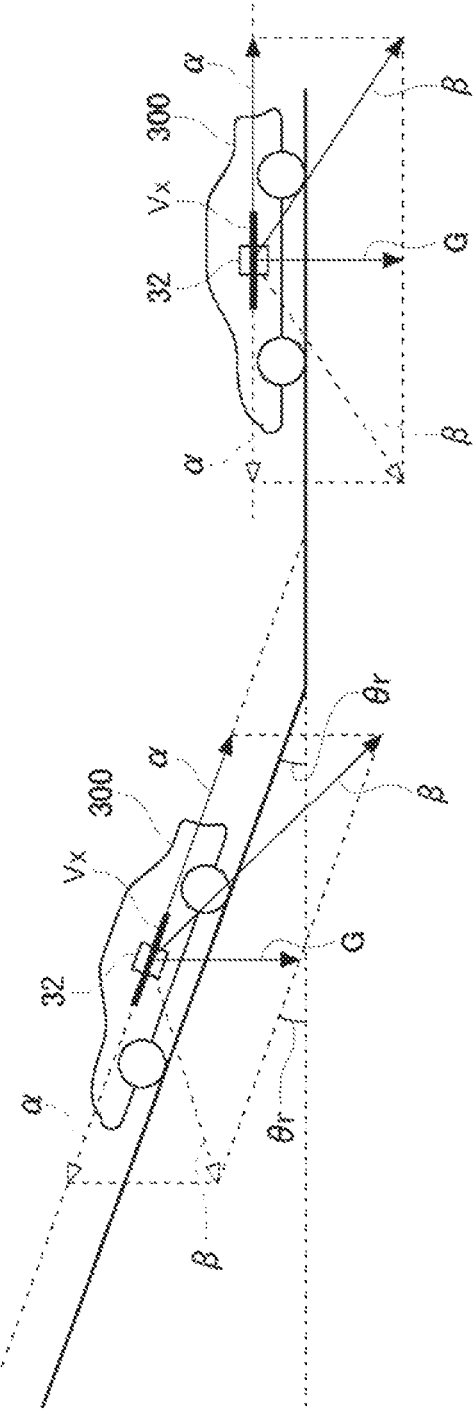
FIG. 9A and FIG. 9B are schematic diagrams for describing a relationship between a direction of a motion acceleration vector of a vehicle and a vehicle attitude angle.
Figure 9B:
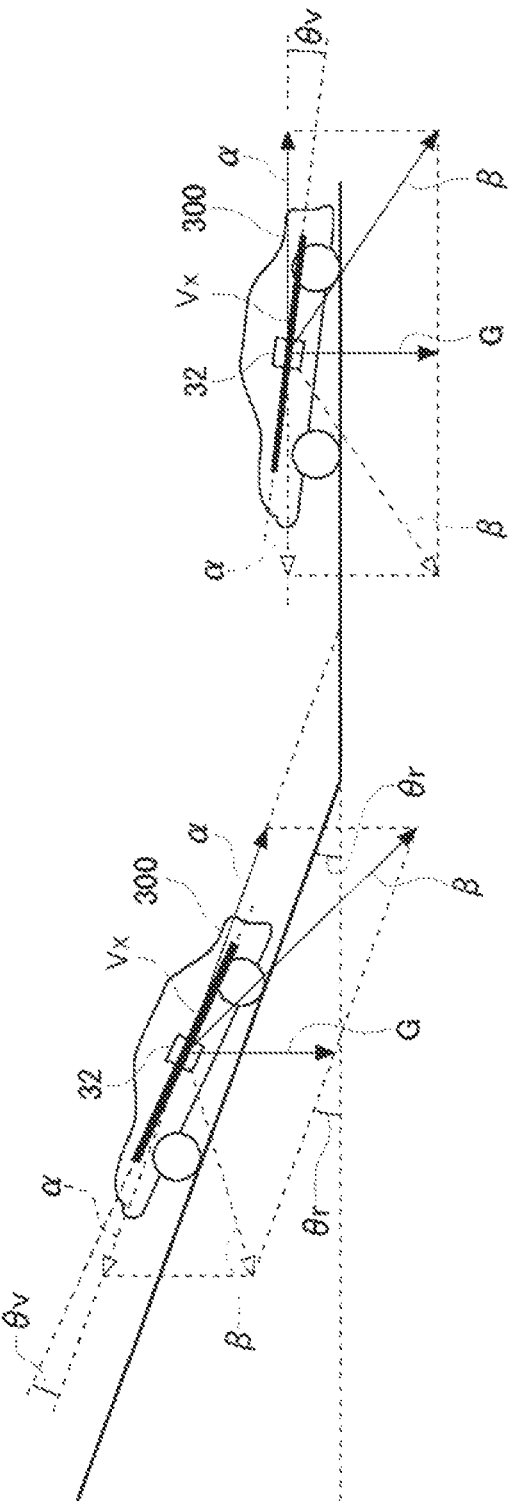
Figure 10:
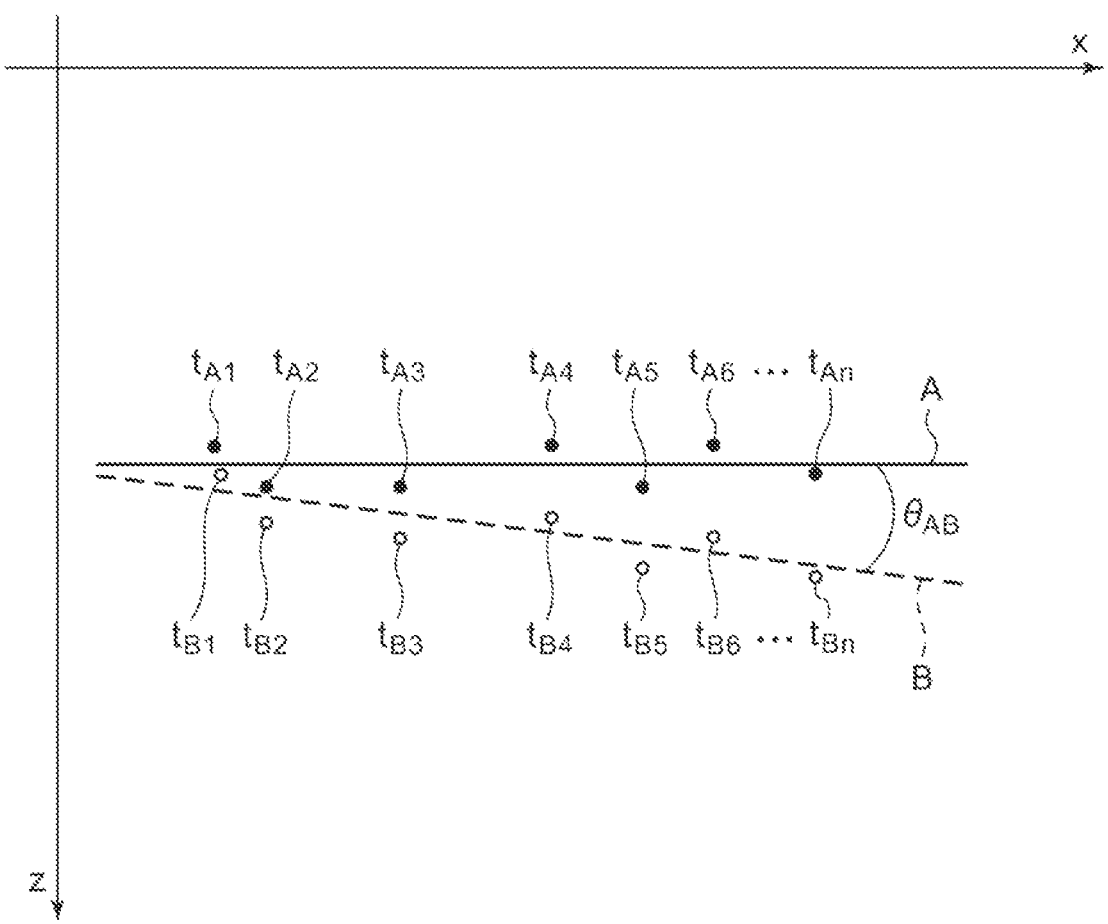
FIG. 10 is a graph illustrating a relationship between an acceleration in a front-and-back direction of a vehicle and an acceleration in a top-and-bottom direction of the vehicle.

FIG. 9(A) and FIG. 9(B) are schematic diagrams for describing a relationship between the direction of a motion acceleration vector of the vehicle and a vehicle attitude angle. FIG. 9(A) illustrates a state in which the vehicle attitude angle θv is 0°, and FIG. 9(B) illustrates a state in which the vehicle attitude angle θv has changed from 0°. In addition, in FIG. 9(A) and FIG. 9(B), the motion acceleration vector α and the composite acceleration vector β that are produced when the vehicle 300 moves forward are indicated by the solid arrows, and the motion acceleration vector α and the composite acceleration vector β that are produced when the vehicle 300 reduces its speed or moves backward are indicated by the dashed arrows. FIG. 10 is a graph illustrating a relationship between the acceleration in the front-and-back direction of the vehicle and the acceleration in the top-and-bottom direction of the vehicle.

The vehicle 300 moves parallel to the road surface. Thus, the motion acceleration vector α is a vector parallel to the road surface regardless of the vehicle attitude angle θv. In addition, as illustrated in FIG. 9(A), when the vehicle attitude angle θv of the vehicle 300 is 0°, theoretically, the front-and-back axis Vx of the vehicle 300 is parallel to the road surface. Therefore, the motion acceleration vector α is a vector parallel to the front-and-back axis Vx of the vehicle 300. Thus, when the magnitude of the motion acceleration vector α changes in association with the acceleration and deceleration of the vehicle 300, the trajectory of the leading end of the composite acceleration vector β detected by the tilt sensor 132 is a straight line parallel to the front-and-back axis Vx of the vehicle 300.

Meanwhile, as illustrated in FIG. 9(B), when the vehicle attitude angle θv is not 0°, the front-and-back axis Vx of the vehicle 300 is inclined relative to the road surface. Therefore, the motion acceleration vector α is a vector extending diagonally relative to the front-and-back axis Vx of the vehicle 300. Then, the trajectory of the leading end of the composite acceleration vector β obtained when the magnitude of the motion acceleration vector α has changed in association with the acceleration or deceleration of the vehicle 300 is a straight line inclined relative to the front-and-back axis Vx of the vehicle 300.

When the output values from the tilt sensor 132 obtained while the vehicle is traveling are plotted onto the coordinates in which the acceleration in the front-and-back direction of the vehicle is set in a first axis (X-axis) and the acceleration in the top-and-bottom direction of the vehicle is set in a second axis (Z-axis), the result illustrated in FIG. 10 can be obtained. In FIG. 10, points $t_{A1}$ to $t_{An}$ are the output values obtained at times $t_1$ to $t_n$ in the state illustrated in FIG. 9(A). Points $t_{B1}$ to $t_{Bn}$ are the output values obtained at times $t_1$ to $t_n$ in the state illustrated in FIG. 9(B). Plotting these output values may include plotting the acceleration values in the vehicle coordinate system obtained from the output values from the tilt sensor 132 or plotting the acceleration values in the sensor coordinate system.

The vehicle attitude angle θv can be estimated by deriving a straight line (or a vector) from at least two points plotted in this manner and by obtaining the slope of the straight line (or the vector). For example, linear approximation equations A and B are obtained with the use of the least-squares method, the moving-average method, or the like on the plurality of plotted points $t_{A1}$ to $t_{An}$ and $t_{B1}$ to $t_{Bn}$, and the slopes of the linear approximation equations A and B are calculated. When the vehicle attitude angle θv is 0°, the linear approximation equation A that is parallel to the x-axis can be obtained from the output values from the tilt sensor 132. In other words, the slope of the linear approximation equation A is 0. In contrast, when the vehicle attitude angle θv is not 0°, the linear approximation equation B having a slope corresponding to the vehicle attitude angle θv can be obtained from the output values from the tilt sensor 132. Thus, either the angle formed by the linear approximation equation A and the linear approximation equation B ($θ_{AB}$ in FIG. 10) or the slope of the linear approximation equation B serves as the vehicle attitude angle θv. Therefore, the vehicle attitude angle θv can be estimated from the slope of a straight line obtained by plotting the output values from the tilt sensor 132 obtained while the vehicle is traveling.

Accordingly, the angle calculating unit 36a plots the output values from the tilt sensor 132 obtained while the vehicle is traveling onto the coordinates in which the acceleration in the front-and-back direction of the vehicle is set in the first axis and the acceleration in the top-and-bottom direction of the vehicle is set in the second axis. Then, the angle calculating unit 36a derives either the vehicle attitude angle θv or the amount of change in the vehicle attitude angle θv with the use of the slope of the straight line obtained from the plotted plurality of points. The angle calculating unit 36a adjusts the reference value of the vehicle attitude angle θv on the basis of either the derived vehicle attitude angle θv or the derived amount of change in the vehicle attitude angle θv. Alternatively, the angle calculating unit 36a holds the derived vehicle attitude angle θv as a new reference value. Thus, the reference value of the vehicle attitude angle θv is corrected.

For example, the angle calculating unit 36a starts the correction process in response to determining that the vehicle 300 is traveling on the basis of the output value from the vehicle speed sensor 308. In the correction process, the output value from the tilt sensor 132 is transmitted to the controlling unit 36 repeatedly at predetermined time intervals. The output value from the tilt sensor 132 transmitted to the controlling unit 36 is held in the RAM 36c. Then, the angle calculating unit 36a plots the output values from the tilt sensor 132 onto the coordinates described above and derives a straight line when the number of the output values has reached a predetermined number required for a single instance of deriving a straight line. Alternatively, the angle calculating unit 36a may plot the output value onto the coordinates each time the angle calculating unit 36a receives an output value from the tilt sensor 132 and may derive a straight line when the number of plotted output values has reached a predetermined number.

The adjustment instructing unit 36b generates an adjustment signal for the optical axis angle θo with the use of the derived vehicle attitude angle θv, the derived amount of change in the vehicle attitude angle θv, or the updated new reference value of the vehicle attitude angle θv, and outputs the generated adjustment signal. Thus, the optical axis angle θo is corrected. Thereafter, the basic control described above is resumed with the corrected vehicle attitude angle θv serving as the reference value of the vehicle attitude angle θv and with the road surface angle θr obtained from the current total angle θ and the stated reference value of the vehicle attitude angle θv serving as the reference value of the road surface angle θr (thus, the reference value of the road surface angle θr is corrected).

(Control Performed when Ignition Switch 314 is Switched On/Off)

The controlling unit 36 according to the present embodiment writes, into the memory 40, the reference value of the road surface angle θr and the reference value of the vehicle attitude angle θv that are each held in the RAM 36c, when the ignition switch 314 shifts to an off state. This configuration makes it possible to store these two reference values in a non-volatile state. Thus, the reference value of the road surface angle θr and the reference value of the vehicle attitude angle θv can be held even when the ignition switch 314 shifts to an off state, and the self-leveling control can be resumed after the ignition switch 314 shifts to an on state.

The controlling unit 36 can determine that the ignition switch 314 is to shift to an off state by receiving a signal from the ignition detecting unit 44. The power required for the operation of writing the reference values into the memory 40 after determining that the ignition switch 314 is to shift to an off state can be covered by, for example but not limited to, the power supplied from the power source 312 during a period from when the ignition switch 314 has entered an off state to when the power supply from the power source 312 stops or the power supplied from an accumulating element (not illustrated), such as a capacitor, provided in the periphery of the power source 312 or in the leveling ECU 30. Alternatively, the power required for the operation of writing the reference values can be covered by providing the leveling ECU 30 with a power supply maintaining unit that maintains the power supply from the power source 312 for a predetermined period while the ignition switch 314 is in an off state.

In the basic control of self-leveling, a change in the total angle θ observed while the vehicle is at rest is estimated to be a change in the vehicle attitude angle θv. On the basis of this technical idea, a change in the total angle θ produced while the ignition switch 314 is off can also be estimated to be a change in the vehicle attitude angle θv. In a situation in which the vehicle 300 is actually used (in other words, in the market mode), a change in the road surface angle θr in association with the movement of the vehicle 300 while the ignition switch 314 is off rarely occurs. Therefore, it is appropriate to estimate the change in the total angle θ observed during a period from when the ignition switch 314 is turned off to when the ignition switch 314 is turned on to be a change in the vehicle attitude angle θv.

Accordingly, as initial control after starting when the ignition switch 314 has shifted to an on state (hereinafter, this control is referred to as starting control, as appropriate), it is conceivable that the current vehicle attitude angle θv is derived from the current total angle θ obtained from the output values from the tilt sensor 132 and the reference value of the road surface angle θr read out from the memory 40 and thus a change in the total angle θ produced while the ignition switch 314 is off is incorporated into the reference value of the vehicle attitude angle θv.

However, it is possible that the road surface angle θr changes while the ignition switch 314 is off. For example, the road surface angle θr changes while the vehicle is at rest when the vehicle 300 is transported or towed by a ship, a car carrier, or the like or when the vehicle 300 is moved by a belt conveyor or a lift within a plant (in other words, in the plant mode). Therefore, if a change in the total angle θ produced while the ignition switch 314 is off is processed altogether as a change in the vehicle attitude angle θv, the accuracy of the self-leveling control may decrease.

Accordingly, if the movement determining unit 46 has determined that the vehicle has not moved while the ignition switch 314 is off, the controlling unit 36 outputs an adjustment signal with respect to a change in the total angle θ observed while the ignition switch 314 is in an off state. Moreover, if the movement determining unit 46 has determined that the vehicle has moved while the ignition switch 314 is off, the controlling unit 36 either refrains from generating or outputting an adjustment signal or outputs a maintaining signal with respect to a change in the total angle θ observed while the ignition switch 314 is in an off state.

To be more specific, in response to the ignition switch 314 shifting to an on state, the controlling unit 36 executes, as the starting control, the two patterns of control indicated below in accordance with the result of the determination made by the movement determining unit 46. First, if the movement determining unit 46 has determined that the vehicle has moved, the controlling unit 36 holds, as a new reference value of the road surface angle θr, the road surface angle θr obtained from the current total angle θ and the reference value of the vehicle attitude angle θv read out from the memory 40 (θr=θ−θv reference value). Thus, the change in the total angle θ produced while the ignition switch 314 is off can be incorporated into the reference value of the road surface angle θr. The reference value of the vehicle attitude angle θv stored in the memory 40 is retained without any change.

When the basic control starts thereafter, in the initial optical axis control, the optical axis Ax is adjusted with the use of the reference value of the vehicle attitude angle θv stored in the memory 40. The reference value of the vehicle attitude angle θv stored in the memory 40 does not include the amount of change in the total angle θ observed while the ignition switch 314 is off. Therefore, an adjustment signal can be kept from being generated with respect to a change in the total angle θ observed while the ignition switch 314 is in an off state.

Meanwhile, if the movement determining unit 46 has determined that the vehicle has not moved, the controlling unit 36 holds, as a new reference value of the vehicle attitude angle θv, the vehicle attitude angle θv obtained from the current total angle θ and the reference value of the road surface angle θr read out from the memory 40 (θv=θ−θr reference value). Thus, the change in the total angle θ produced while the ignition switch 314 is off can be incorporated into the reference value of the vehicle attitude angle θv. The reference value of the road surface angle θr stored in the memory 40 is retained without any change.

When the basic control starts thereafter, in the initial optical axis control, the optical axis Ax is adjusted with the use of the new reference value of the vehicle attitude angle θv updated in the starting control. Thus, an adjustment signal can be output with respect to a change in the vehicle attitude angle θv produced while the ignition switch 314 is off. In the starting control, the optical axis Ax may be adjusted with the use of either the calculated vehicle attitude angle θv or the new reference value of the vehicle attitude angle θv.

When the movement determining unit 46 has determined that the vehicle has moved and when there has been a change in the vehicle attitude angle θv, the amount of this change in the vehicle attitude angle θv is incorporated into the reference value of the road surface angle θr. Moreover, when the movement determining unit 46 has determined that the vehicle has not moved and when there has been a change in the road surface angle θr, the amount of this change in the road surface angle θr is incorporated into the reference value of the vehicle attitude angle θv. In these cases, an error arises between the actual road surface angle θr and vehicle attitude angle θv and the reference value of the road surface angle θr and the reference value of the vehicle attitude angle θv that are each held by the controlling unit 36. However, this error can be corrected through the correction process described above.

The movement determining unit 46 can determine whether the vehicle has moved by comparing the position information held before the ignition switch 314 is turned off and the position information held after the ignition switch 314 is turned on. Moreover, the movement determining unit 46 can determine whether the vehicle has moved by comparing the image information acquired from the camera 316 before the ignition switch 314 is turned off and the image information acquired from the camera 316 after the ignition switch 314 is turned on.

Moreover, the movement determining unit 46 can determine that the vehicle 300 has moved while the ignition switch 314 is off if the latest identification signal received from the signal receiving unit 318 is a signal for setting the plant mode. In a situation in which the vehicle 300 is in the plant mode, it is possible that the vehicle 300 is moved while the ignition switch 314 is in an off state, but it is unlikely that any luggage is loaded into the vehicle 300 or a person gets in or out of the vehicle 300. Therefore, when the leveling ECU 30 is in the plant mode, it is possible to estimate that the vehicle 300 has moved while the ignition switch 314 is off. When the leveling ECU 30 is in the plant mode, it may be determined uniformly that the vehicle has moved regardless of whether the vehicle 300 has actually moved. This is because even if the starting control is executed in response to determining that the vehicle has moved even when the vehicle 300 has not actually moved, the actual road surface angle θr and the reference value of the road surface angle θr do not deviate from each other due to the starting control.

Meanwhile, the movement determining unit 46 can determine that the vehicle 300 has not moved while the ignition switch 314 is off if the latest identification signal received from the signal receiving unit 318 is a signal for setting the market mode. In a situation in which the vehicle 300 is in the market mode, it is possible that luggage is loaded into the vehicle 300 or a person gets in or out of the vehicle 300 while the ignition switch 314 is off, but it is unlikely that the vehicle 300 is moved. Therefore, when the leveling ECU 30 is in the market mode, it is possible to estimate that the vehicle 300 has not moved while the ignition switch 314 is off.

Figure 11:
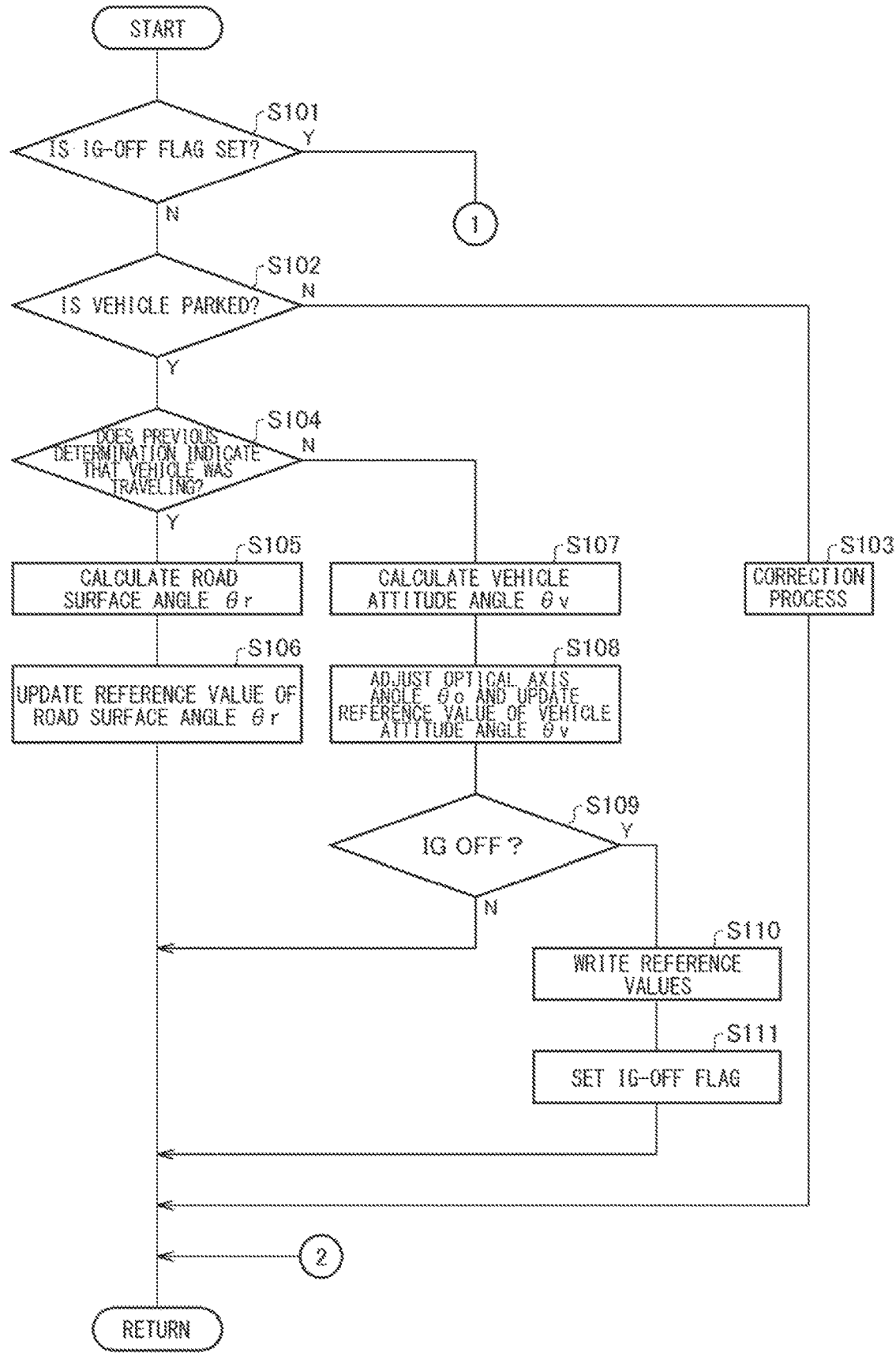
FIG. 11 is a flowchart illustrating an example of self-leveling control executed by a leveling ECU according to Embodiment 2.
Figure 12:
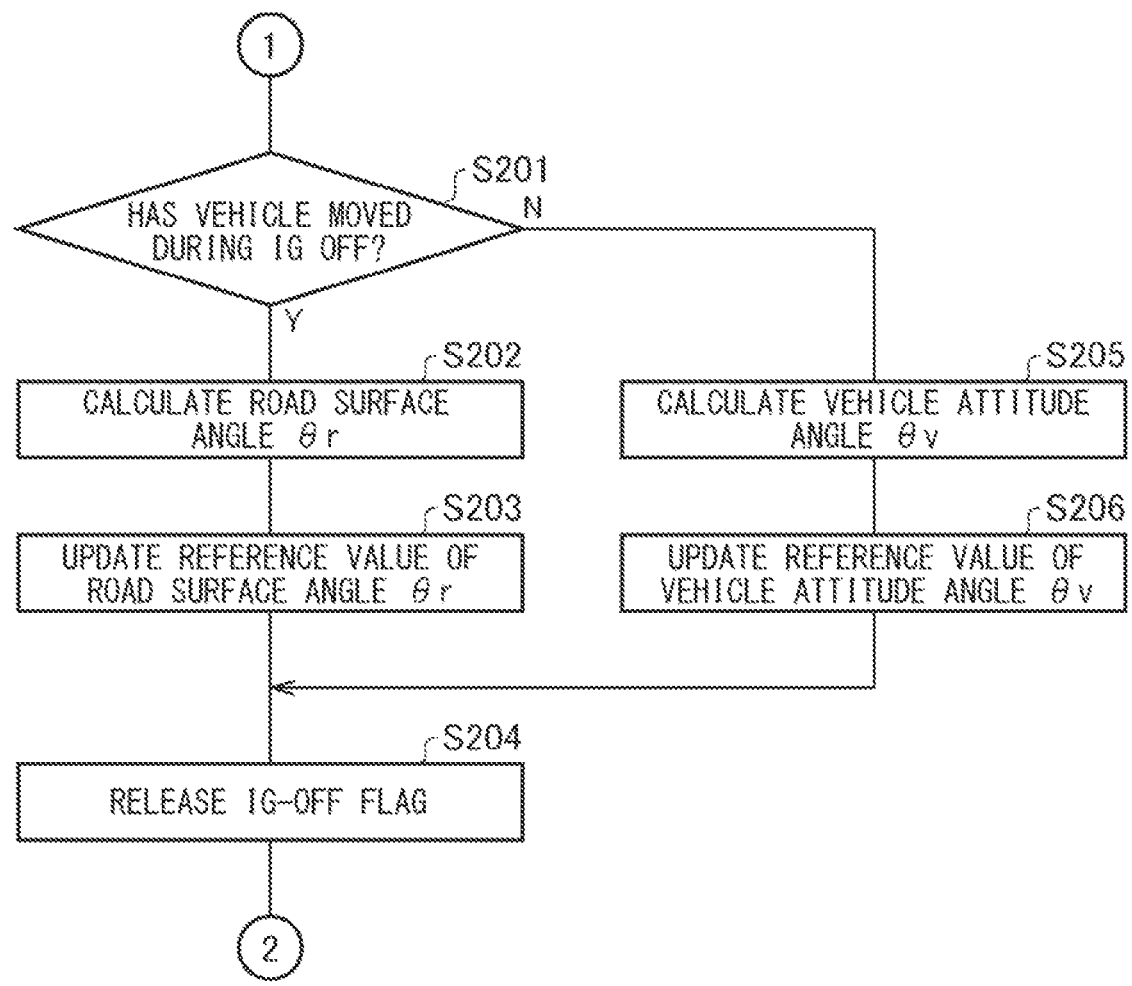
FIG. 12 is a flowchart illustrating the example of the self-leveling control executed by the leveling ECU according to Embodiment 2.

FIG. 11 and FIG. 12 are flowcharts illustrating an example of self-leveling control executed by the leveling ECU according to Embodiment 2. This flow is executed repeatedly at predetermined timings by the leveling ECU 30, for example, when the light switch 304 has instructed that the self-leveling control be executed and the ignition switch 314 is on. The flow is then terminated when the instruction to execute the self-leveling control is canceled (or the termination is instructed) or the ignition switch 314 is turned off.

As illustrated in FIG. 11, first, the leveling ECU 30 determines whether an IG-OFF flag is set that indicates that the ignition switch 314 has shifted to an off state (S101). The controlling unit 36 can determine whether the IG-OFF flag is set on the basis of whether the IG-OFF flag is stored in the memory 40. If the IG-OFF flag is set, it means that this routine is the initial routine performed after the ignition switch 314 has shifted to an on state.

If the IG-OFF flag is not set (N at S101), the leveling ECU 30 executes the basic control. Specifically, the leveling ECU 30 determines whether the vehicle 300 is parked (S102). The leveling ECU 30 can determine whether the vehicle 300 is parked on the basis of the output value from the vehicle speed sensor 308. If the vehicle 300 is not parked (N at S102), in other words, if the vehicle 300 is traveling, the leveling ECU 30 executes the correction process (S103) and then terminates this routine.

If the vehicle 300 is parked (Y at S102), the leveling ECU 30 determines whether the vehicle 300 was traveling (N at S102) in the parking determination at step S102 of the previous routine (S104). If the previous determination indicates that the vehicle 300 was traveling (Y at S104), which means that "the vehicle is stopping," the leveling ECU 30 calculates the road surface angle θr by subtracting the reference value of the vehicle attitude angle θv from the current total angle θ (S105). Then, the leveling ECU 30 updates the reference value of the road surface angle θr with the obtained road surface angle θr used as a new reference value of the road surface angle θr (S106) and terminates this routine.

If the previous determination indicates that the vehicle 300 was not traveling (N at S104), which means "the vehicle is at rest," the leveling ECU 30 calculates the vehicle attitude angle θv by subtracting the reference value of the road surface angle θr from the current total angle θ (S107). Then, the leveling ECU 30 adjusts the optical axis angle θo with the use of the obtained vehicle attitude angle θv and updates the reference value of the vehicle attitude angle θv with the obtained vehicle attitude angle θv used as a new reference value (S108).

Thereafter, the leveling ECU 30 determines whether the ignition switch 314 has shifted to an off state (S109). If the ignition switch 314 has not shifted to an off state (N at S109), the leveling ECU 30 terminates this routine. If the ignition switch 314 has shifted to an off state (Y at S109), the leveling ECU 30 writes, into the memory 40, the reference value of the road surface angle θr and the reference value of the vehicle attitude angle θv that are each held in the RAM 36c (S110). Then, the leveling ECU 30 sets the IG-OFF flag (S111) and terminates this routine. The leveling ECU 30 can set the IG-OFF flag by writing the IG-OFF flag into the memory 40.

If the IG-OFF flag is set (Y at S101), the leveling ECU 30 proceeds to the starting control illustrated in FIG. 12. First, the leveling ECU 30 determines whether the vehicle 300 has moved while the ignition switch 314 is off (S201). If the vehicle 300 has moved (Y at S201), the leveling ECU 30 calculates the road surface angle θr by subtracting the reference value of the vehicle attitude angle θv read out from the memory 40 from the current total angle θ (S202). Then, the leveling ECU 30 updates the reference value of the road surface angle θr with the obtained road surface angle θr used as a new reference value of the road surface angle θr (S203). Thereafter, the leveling ECU 30 releases the setting of the IG-OFF flag (S204) and terminates this routine. The leveling ECU 30 can release the setting of the IG-OFF flag by deleting the IG-OFF flag stored in the memory 40.

If the vehicle 300 has not moved (N at S201), the leveling ECU 30 calculates the vehicle attitude angle θv by subtracting the reference value of the road surface angle θr read out from the memory 40 from the current total angle θ (S205). Then, the leveling ECU 30 updates the reference value of the vehicle attitude angle θv with the obtained vehicle attitude angle θv used as a new reference value of the vehicle attitude angle θv (S206). Thereafter, the leveling ECU 30 releases the setting of the IG-OFF flag (S204) and terminates this routine.

As described thus far, the leveling ECU 30 serving as the control device for the vehicle lamp 1 according to the present embodiment includes the receiving unit 34, the controlling unit 36, and the movement determining unit 46. The receiving unit 34 receives a signal indicating an output value from the tilt sensor 132 enabled for deriving the total angle θ that is the angle of inclination of the vehicle 300 relative to the horizontal plane. The controlling unit 36 outputs an adjustment signal for the optical axis angle θo with respect to a change in the total angle θ observed while the vehicle is at rest and either refrains from generating or outputting an adjustment signal or outputs a maintaining signal for the optical axis angle θo with respect to a change in the total angle θ observed while the vehicle is traveling. The movement determining unit 46 determines whether the vehicle 300 has moved while the ignition switch 314 is in an off state. If the movement determining unit 46 has determined that the vehicle has not moved, the controlling unit 36 outputs an adjustment signal with respect to a change in the total angle θ observed while the ignition switch 314 is in an off state. If the movement determining unit 46 has determined that the vehicle has moved, the controlling unit 36 either refrains from generating or outputting an adjustment signal or outputs a maintaining signal with respect to a change in the total angle θ observed while the ignition switch 314 is in an off state.

In other words, the leveling ECU 30 according to the present embodiment determines whether the vehicle has moved during IG OFF and, in accordance with the result of the determination, switches between execution and non-execution of the optical axis adjustment with respect to a change in the total angle θ observed during IG OFF. Thus, the accuracy of the self-leveling control of the vehicle lamp 1 can be increased.

The controlling unit 36 according to the present embodiment holds the reference value of the road surface angle θr and the reference value of the vehicle attitude angle θv in the RAM 36c in a volatile state. With respect to a change in the total angle θ observed while the vehicle is at rest, the controlling unit 36 holds, as a new reference value of the vehicle attitude angle θv, the vehicle attitude angle θv that is equal to the total of the amount of change in the total angle θ observed while the vehicle is at rest and the reference value of the vehicle attitude angle θv. With respect to a change in the total angle θ observed while the vehicle is traveling, the controlling unit 36 holds, as a new reference value of the road surface angle θr, the road surface angle θr that is equal to the total of the amount of change in the total angle θ observed while the vehicle is traveling and the reference value of the road surface angle θr. Such control makes it possible to achieve the self-leveling control involving the tilt sensor 132 through a simple control structure.

The leveling ECU 30 includes the memory 40 for storing, in a non-volatile state, the reference value of the road surface angle θr and the reference value of the vehicle attitude angle θv held in a volatile state by the controlling unit 36 when the ignition switch 314 shifts to an off state. Then, in response to the ignition switch 314 shifting to an on state, the controlling unit 36 either holds, as a new reference value of the road surface angle θr, the road surface angle θr obtained from the current total angle θ and the reference value of the vehicle attitude angle θv read out from the memory 40 if the movement determining unit 46 has determined that the vehicle has moved or holds, as a new reference value of the vehicle attitude angle θv, the vehicle attitude angle θv obtained from the current total angle θ and the reference value of the road surface angle θr read out from the memory 40 if the movement determining unit 46 has determined that the vehicle has not moved. This configuration makes it possible to improve the accuracy of the self-leveling control through a simple control structure.

The movement determining unit 46 determines whether the vehicle 300 has moved while the ignition switch 314 is in an off state on the basis of any one or more of the position information of the vehicle 300, a signal identifying whether the vehicle 300 in on the market or in a plant, and information regarding an object in the surroundings of the vehicle. This configuration makes it possible to determine the movement of the vehicle 300 simply and reliably.

Thus far, Embodiment 2 according to the present invention has been described in detail. The embodiment described above merely illustrates a specific example for implementing the present invention. The content of the embodiment does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to the embodiment described above, the expressions "according to the present embodiment," "in the present embodiment," and so on are added for emphasis to the content that can be subjected to such a design change as described above, but such a design change is also permitted on the content without these expressions. A desired combination of the constituent elements described above is also valid as an aspect of the present invention. Hatching added along the sections in the drawings does not limit the material of those with hatching.

According to Embodiment 2, the controlling unit 36 writes the reference value of the road surface angle θr and the reference value of the vehicle attitude angle θv into the memory 40 when the ignition switch 314 shifts to an off state. This configuration, however, is not limiting, and the leveling ECU 30 may execute control of Variation 1 to 3 described below.

(Variation 1)

The leveling ECU 30 according to Variation 1 stores, into the memory 40 in a non-volatile state, the reference value of the vehicle attitude angle θv that the controlling unit 36 holds in the RAM 36c and the total angle θ held when the ignition switch 314 shifts to an off state, when the ignition switch 314 shifts to an off state. The "total angle θ held when shifting to an off state" is, for example, the latest total angle θ held in the RAM 36c when the ignition switch 314 shifts to an off state. Then, in response to the ignition switch 314 shifting to an on state, the controlling unit 36 holds, as a new reference value of the road surface angle θr, the road surface angle θr obtained from the current total angle θ and the reference value of the vehicle attitude angle θv read out from the memory 40 if the movement determining unit 46 has determined that the vehicle has moved (θr=θ−θv reference value). The reference value of the vehicle attitude angle θv stored in the memory 40 is retained without any change.

Meanwhile, if the movement determining unit 46 has determined that the vehicle has not moved, the controlling unit 36 holds, as a new reference value of the vehicle attitude angle θv, the vehicle attitude angle θv obtained from the reference value of the vehicle attitude angle θv read out from the memory 40 and a difference Δθ3 between the current total angle θ and the total angle θ read out from the memory 40 (θv=θv reference value+Δθ3). Moreover, the controlling unit 36 holds, as a new reference value of the road surface angle θr, the road surface angle θr obtained from the current total angle θ and the calculated vehicle attitude angle θv (including the new reference value of the vehicle attitude angle θv) (θr=θ−θv reference value). Through such control as well, the accuracy of the self-leveling control can be increased.

(Variation 2)

The leveling ECU 30 according to Variation 2 stores, into the memory 40 in a non-volatile state, the reference value of the road surface angle θr that the controlling unit 36 holds in the RAM 36c and the total angle θ held when the ignition switch 314 shifts to an off state, when the ignition switch 314 shifts to an off state. Then, in response to the ignition switch 314 shifting to an on state, the controlling unit 36 holds, as a new reference value of the road surface angle θr, the road surface angle θr obtained from the reference value of the road surface angle θr read out from the memory 40 and the difference Δθ3 between the current total angle θ and the total angle θ read out from the memory 40 if the movement determining unit 46 has determined that the vehicle has moved (θr=θr reference value+Δθ3). Moreover, the controlling unit 36 holds, as a new reference value of the vehicle attitude angle θv, the vehicle attitude angle θv obtained from the current total angle θ and the calculated road surface angle θr (including the new reference value of the road surface angle θr) (θv=θ−θr reference value).

Meanwhile, if the movement determining unit 46 has determined that the vehicle has not moved, the controlling unit 36 holds, as a new reference value of the vehicle attitude angle θv, the vehicle attitude angle θv obtained from the current total angle θ and the reference value of the road surface angle θr read out from the memory 40 (θv=θ−θr reference value). The reference value of the road surface angle θr stored in the memory 40 is retained without any change. Through such control as well, the accuracy of the self-leveling control can be increased.

(Variation 3)

The leveling ECU 30 according to Variation 3 stores, into the memory 40 in a non-volatile state, the reference value of the road surface angle θr that the controlling unit 36 holds in the RAM 36c, the reference value of the vehicle attitude angle θv that the controlling unit 36 holds in the RAM 36c, and the total angle θ held when the ignition switch 314 shifts to an off state, when the ignition switch 314 shifts to an off state. Then, in response to the ignition switch 314 shifting to an on state, the controlling unit 36 holds, as a new reference value of the road surface angle θr, the road surface angle θr obtained from the reference value of the road surface angle θr read out from the memory 40 and the difference Δθ3 between the current total angle θ and the total angle θ read out from the memory 40 if the movement determining unit 46 has determined that the vehicle has moved (θr=θr reference value+Δθ3). The reference value of the vehicle attitude angle θv stored in the memory 40 is retained without any change.

Meanwhile, if the movement determining unit 46 has determined that the vehicle has not moved, the controlling unit 36 holds, as a new reference value of the vehicle attitude angle θv, the vehicle attitude angle θv obtained from the reference value of the vehicle attitude angle θv read out from the memory 40 and a difference Δθ3 between the current total angle θ and the total angle θ read out from the memory 40 (θv=θv reference value+Δθ3). The reference value of the road surface angle θr stored in the memory 40 is retained without any change. Through such control as well, the accuracy of the self-leveling control can be increased.

(Others)

Except where any technical misalignment occurs, holding a value obtained through a calculation involving a predetermined component includes holding the component used to calculate that value. For example, when the reference value of the road surface angle θr is calculated by subtracting the reference value of the vehicle attitude angle θv from the total angle θ, holding the reference value of the road surface angle θr includes holding the total angle θ and the reference value of the vehicle attitude angle θv used in the calculation. Likewise, when the reference value of the vehicle attitude angle θv is calculated by subtracting the reference value of the road surface angle θr from the total angle θ, holding the reference value of the vehicle attitude angle θv includes holding the total angle θ and the reference value of the road surface angle θr used in the calculation. Moreover, holding the total angle θ includes holding the output value from the tilt sensor 132.

In the basic control of self-leveling, if the controlling unit 36 obtains the vehicle attitude angle θv that includes the amount of change in the total angle θ observed while the vehicle is at rest by adding the difference Δθ2 to the reference value of the vehicle attitude angle θv, this enables the self-leveling control that does not involve the reference value of the road surface angle θr. Through such control, the self-leveling control can be simplified. Moreover, if the controlling unit 36 calculates the road surface angle θr that includes the amount of change in the total angle θ observed while the vehicle is traveling by adding the difference Δθ1 to the reference value of the road surface angle θr and obtains the vehicle attitude angle θv by subtracting this reference value of the road surface angle θr from the total angle θ while the vehicle is at rest, this enables the self-leveling control that does not involve the reference value of the vehicle attitude angle θv. Through such control as well, the self-leveling control can be simplified.

An acceleration sensor is used as an example of the tilt sensor 132 according to Embodiment 2 and the variations described above. The tilt sensor 132, however, may be a different type of sensor, such as a gyro sensor or a geomagnetic sensor.

The invention according to Embodiment 2 described above may be identified through the item indicated below.

[Item 1] A vehicle lamp system, comprising:
- a vehicle lamp (1) with an adjustable optical axis (Ax);
- a tilt sensor (132) enabled for deriving an angle of inclination of a vehicle (300) relative to a horizontal plane; and
- a control device (30) for the vehicle lamp (1).

What is claimed is:

1. A control device for a vehicle lamp, the control device comprising:
   - a receiving unit that receives a signal indicating an output value from a tilt sensor enabled for deriving an angle of inclination of a vehicle relative to a horizontal plane;
   - a controlling unit that outputs an adjustment signal instructing that an optical axis angle of the vehicle lamp be adjusted with respect to a change in the angle of inclination observed while the vehicle is at rest and either refrains from generating or outputting the adjustment signal or outputs a maintaining signal instructing that the optical axis angle be maintained with respect to a change in the angle of inclination observed while the vehicle is traveling; and
   - a movement determining unit that determines whether the vehicle has moved while an ignition switch is in an off state, wherein
   - the controlling unit outputs the adjustment signal with respect to a change in the angle of inclination observed while the ignition switch is in an off state if the movement determining unit has determined that the vehicle has not moved and either refrains from generating or outputting the adjustment signal or outputs the maintaining signal with respect to a change in the angle of inclination observed while the ignition switch is in an off state if the movement determining unit has determined that the vehicle has moved.

2. The control device for a vehicle lamp according to claim 1, wherein
   - when the angle of inclination of the vehicle relative to the horizontal plane is referred to as a total angle, the total angle includes a road surface angle and a vehicle attitude angle, the road surface angle being an angle of inclination of a road surface relative to the horizontal plane, the vehicle attitude angle being an angle of inclination of the vehicle relative to the road surface,
   - the controlling unit holds, in a volatile state, a reference value of the road surface angle and a reference value of the vehicle attitude angle,
   - with respect to a change in the total angle observed while the vehicle is at rest, the controlling unit holds, as a new reference value of the vehicle attitude angle, a vehicle attitude angle that is equal to a total of an amount of change in the total angle observed while the vehicle is at rest and the reference value of the vehicle attitude angle, and with respect to a change in the total angle observed while the vehicle is traveling, the controlling unit holds, as a new reference value of the road surface angle, a road surface angle that is equal to a total of an amount of change in the total angle observed while the vehicle is traveling and the reference value of the road surface angle.

3. The control device for a vehicle lamp according to claim 2, further comprising:

a storage for storing, in a non-volatile state, the reference value of the road surface angle and the reference value of the vehicle attitude angle that the controlling unit holds when the ignition switch shifts to an off state, wherein in response to the ignition switch shifting to an on state, the controlling unit holds, as a new reference value of the road surface angle, a road surface angle obtained from the current total angle and the reference value of the vehicle attitude angle read out from the storage if the movement determining unit has determined that the vehicle has moved, and holds, as a new reference value of the vehicle attitude angle, a vehicle attitude angle obtained from the current total angle and the reference value of the road surface angle read out from the storage if the movement determining unit has determined that the vehicle has not moved.

4. The control device for a vehicle lamp according to claim 2, further comprising:

a storage for storing, in a non-volatile state, the reference value of the vehicle attitude angle that the controlling unit holds when the ignition switch shifts to an off state and the total angle held when the ignition switch shifts to an off state, wherein in response to the ignition switch shifting to an on state, the controlling unit holds, as a new reference value of the road surface angle, a road surface angle obtained from the current total angle and the reference value of the vehicle attitude angle read out from the storage if the movement determining unit has determined that the vehicle has moved, and holds, as a new reference value of the vehicle attitude angle, a vehicle attitude angle obtained from the reference value of the vehicle attitude angle read out from the storage and a difference between the current total angle and the total angle read out from the storage and holds, as a new reference value of the road surface angle, a road surface angle obtained from the current total angle and the calculated vehicle attitude angle if the movement determining unit has determined that the vehicle has not moved.

5. The control device for a vehicle lamp according to claim 2, further comprising:

a storage for storing, in a non-volatile state, the reference value of the road surface angle that the controlling unit holds when the ignition switch shifts to an off state and the total angle held when the ignition switch shifts to an off state, wherein in response to the ignition switch shifting to an on state, the controlling unit holds, as a new reference value of the road surface angle, a road surface angle obtained from the reference value of the road surface angle read out from the storage and a difference between the current total angle and the total angle read out from the storage and holds, as a new reference value of the vehicle attitude angle, a vehicle attitude angle obtained from the current total angle and the calculated road surface angle if the movement determining unit has determined that the vehicle has moved, and holds, as a new reference value of the vehicle attitude angle, a vehicle attitude angle obtained from the current total angle and the reference value of the road surface angle read out from the storage if the movement determining unit has determined that the vehicle has not moved.

6. The control device for a vehicle lamp according to claim 2, further comprising:

a storage for storing, in a non-volatile state, the reference value of the road surface angle that the controlling unit holds when the ignition switch shifts to an off state, the reference value of the vehicle attitude angle that the controlling unit holds when the ignition switch shifts to an off state, and the total angle held when the ignition switch shifts to an off state, wherein in response to the ignition switch shifting to an on state, the controlling unit holds, as a new reference value of the road surface angle, a road surface angle obtained from the reference value of the road surface angle read out from the storage and a difference between the current total angle and the total angle read out from the storage if the movement determining unit has determined that the vehicle has moved, and holds, as a new reference value of the vehicle attitude angle, a vehicle attitude angle obtained from the reference value of the vehicle attitude angle read out from the storage and a difference between the current total angle and the total angle read out from the storage if the movement determining unit has determined that the vehicle has not moved.

7. The control device for a vehicle lamp according to claim 1, wherein the movement determining unit determines whether the vehicle has moved while the ignition switch is in an off state on the basis of any one or more of position information of the vehicle, a signal identifying whether the vehicle is on a market or at a plant, and information regarding an object in surroundings of the vehicle.

8. A vehicle lamp system, comprising:

a vehicle lamp with an adjustable optical axis;

a tilt sensor enabled for deriving an angle of inclination of a vehicle relative to a horizontal plane; and the control device for a vehicle lamp according to claim 1.

* * * * *